United States Patent
Furukawa

(10) Patent No.: US 11,845,875 B2
(45) Date of Patent: Dec. 19, 2023

(54) GLITTERY INK AND IMAGE FORMING DEVICE

(71) Applicant: Juichi Furukawa, Kanagawa (JP)

(72) Inventor: Juichi Furukawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 17/455,966

(22) Filed: Nov. 22, 2021

(65) Prior Publication Data
US 2022/0169879 A1  Jun. 2, 2022

(30) Foreign Application Priority Data

Nov. 30, 2020 (JP) .................................. 2020-198506
Nov. 5, 2021 (JP) .................................. 2021-181336

(51) Int. Cl.
*C09D 11/38* (2014.01)
*G01N 15/02* (2006.01)

(52) U.S. Cl.
CPC .......... *C09D 11/38* (2013.01); *G01N 15/0211* (2013.01); *G01N 2015/0222* (2013.01)

(58) Field of Classification Search
CPC ..... C09D 11/38; C09D 11/102; C09D 11/104; C09D 11/322; G01N 15/0211; G01N 2015/0222; G01N 2015/0053
USPC ........................................................... 347/1
See application file for complete search history.

(56) References Cited

U.S. PATENT DOCUMENTS

| | | | |
|---|---|---|---|
| 2012/0041110 A1* | 2/2012 | Rieth | C08K 5/1565 524/108 |
| 2017/0247561 A1 | 8/2017 | Nakagawa et al. | |
| 2018/0001669 A1 | 1/2018 | Furukawa et al. | |
| 2018/0056692 A1 | 3/2018 | Tomura et al. | |
| 2018/0094155 A1 | 4/2018 | Fujita et al. | |
| 2018/0118966 A1 | 5/2018 | Tomura et al. | |
| 2018/0127610 A1 | 5/2018 | Kido et al. | |
| 2018/0178538 A1 | 6/2018 | Miyazawa et al. | |
| 2018/0320011 A1 | 11/2018 | Kido et al. | |
| 2019/0010331 A1 | 1/2019 | Fujita et al. | |
| 2019/0030940 A1 | 1/2019 | Tomura et al. | |

(Continued)

FOREIGN PATENT DOCUMENTS

| JP | 2013-180434 | 9/2013 |
|---|---|---|
| JP | 2014-194022 | 10/2014 |

(Continued)

*Primary Examiner* — Matthew Luu
*Assistant Examiner* — Alexander D Shenderov
(74) *Attorney, Agent, or Firm* — Grüneberg and Myers, PLLC

(57) ABSTRACT

A glittery ink contains glittery pigment particles, resin particles, and an organic solvent, wherein the following relationships are satisfied: a≤c≤b and a<b, where a represents the particle diameter of the resin particles corresponding to the minimum of two or more peaks in a particle size distribution as measured by a dynamic light scattering particle size distribution measuring device, b represents the particle diameter of the resin particles corresponding to the maximum of the two or more peaks in the particle size distribution, and c represents the particle diameter of the glittery pigment corresponding to a maximum number of particles in a particle size distribution as measured by the dynamic light scattering particle size distribution measuring device.

8 Claims, 4 Drawing Sheets

(56) References Cited

U.S. PATENT DOCUMENTS

| | | |
|---|---|---|
| 2019/0092956 A1 | 3/2019 | Imanaga et al. |
| 2019/0094422 A1* | 3/2019 | Goto .......................... B41J 2/17 |
| 2019/0276692 A1 | 9/2019 | Furukawa et al. |
| 2019/0345356 A1 | 11/2019 | Kido et al. |
| 2020/0224048 A1 | 7/2020 | Furukawa et al. |

FOREIGN PATENT DOCUMENTS

| | | |
|---|---|---|
| JP | 2017-210553 | 11/2017 |
| JP | 2020-049919 | 4/2020 |

* cited by examiner

GLITTERY INK AND IMAGE FORMING DEVICE

CROSS-REFERENCE TO RELATED APPLICATIONS

This patent application is based on and claims priority pursuant to 35 U.S.C. § 119 to Japanese Patent Application Nos. 2020-198506 and 2021-181336, filed on Nov. 30, 2020 and Nov. 5, 2021, respectively, in the Japan Patent Office, the entire disclosures of which are hereby incorporated by reference herein.

BACKGROUND

Technical Field

The present disclosure relates to a glittery ink and an image forming device.

Description of the Related Art

Printing media are diversifying. In consequence, printing media are now used in many fields, from printing in office to large-scale printing such as commercial printing.

Printed matter can have a full color image on a printing medium by mixing colors.

Printed matter having a metallic gloss, in particular, including a silver coloring material having excellent mirror surface image clarity, is extremely valuable in industrial fields because full color images obtained by mixing the silver coloring material with other colors have a high mirror surface image clarity.

SUMMARY

According to embodiments of the present disclosure, a glittery ink is provided which contains glittery pigment particles, resin particles, and an organic solvent, wherein the following relationships are satisfied: a≤c≤b and a<b, where a represents the particle diameter of the resin particles corresponding to the minimum of two or more peaks in a particle size distribution as measured by a dynamic light scattering particle size distribution measuring device, b represents the particle diameter of the resin particles corresponding to the maximum of the two or more peaks in the particle size distribution, and c represents the particle diameter of the glittery pigment corresponding to the maximum number of particles in a particle size distribution as measured by the dynamic light scattering particle size distribution measuring device.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
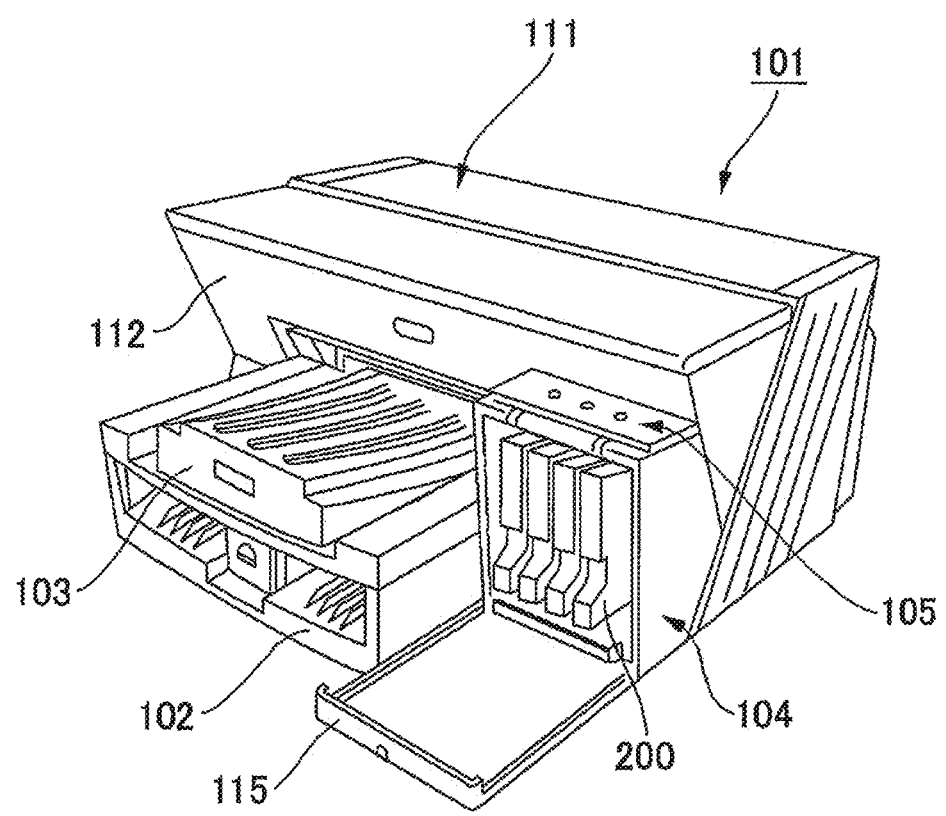
FIG. 1 is a schematic diagram illustrating an example of the inkjet printing device according to an embodiment of the present invention.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a glittery ink is provided which demonstrates a high level of gloss and has excellent attachability.

The glittery ink 1 of the present disclosure contains glittery pigment particles, resin particles, and an organic solvent, wherein the following relationships are satisfied: a≤c≤b and a<b, where a represents the particle diameter of the resin particles corresponding to the minimum of two or more peaks in a particle size distribution as measured by a dynamic light scattering particle size distribution measuring device, b represents the particle diameter of the resin particles corresponding to the maximum of the two or more peaks, and c represents the particle diameter of the glittery pigment corresponding to the maximum number of particles in a particle size distribution as measured by the dynamic light scattering particle size distribution measuring device.

Embodiments of the present disclosure are described in detail below.

The glittery ink 1 of the present disclosure is as described above and also includes the following embodiments of 2 to 7.

2. The glittery ink according to 1 mentioned above, wherein the resin particles are a mixture of two or more types of resin particles having different number average particle diameters, wherein the two or more types of resin particles contain one or more types of resin particles 1 having a number average particle diameter smaller than the number average particle diameter of the glittery pigment and one or more types of resin particles 2 having a number average particle diameter greater than the number average particle diameter of the glittery pigment.

According to this embodiment, a glittery ink is provided which demonstrates a higher level of gloss and has more excellent attachability.

3. The glittery ink according to 2 mentioned above, wherein the number average particle diameter of the resin particles 1 is by 10 nm or more smaller than the number average particle diameter of the glittery pigment particles and the number average particle diameter of the resin particles 2 is by 10 nm or more greater than the number average particle diameter of the glittery pigment particles.

According to this embodiment, a glittery ink is provided which demonstrates a higher level of gloss and has more excellent attachability.

4. The glossy ink according to any one of 1 to 3 mentioned above, wherein the resin particles have urethane resin chains.

According to this embodiment, a glittery ink is provided which demonstrates a high level of abrasion resistance.

5. The glossy ink according to any one of 1 to 4 mentioned above, wherein the resin particles have polyester resin chains.

According to this embodiment, a glittery ink is provided which demonstrates a strong attachability.

6. The glossy ink according to 2 mentioned above, wherein the resin particles 1 has a thermosoftening temperature lower than the thermosoftening temperature of the resin particles 2.

According to this embodiment, a glittery ink is provided which demonstrates a higher level of gloss.

7. The glittery ink according to any one of 1 to 6 mentioned above, wherein the glittery pigment particles have a volume average particle diameter (D50) of from 20 nm to 100 nm.

According to this embodiment, a glittery ink is provided which demonstrates a higher level of gloss and has more excellent attachability.

8. An image forming device includes a print head accommodating the glittery ink of any one of 1 to 7 mentioned above.

According to this embodiment, a glittery ink is provided which demonstrates a high level of gloss and has more excellent attachability.

The glittery ink of the present disclosure strikes a balance between the gloss and the attachability in comparison with common glittery inks.

The mechanism of this striking a balance is not clear: however, the present inventor infers that the following geometrical model can explain that mechanism. The models is shown in FIG. 3.

Figure 3:
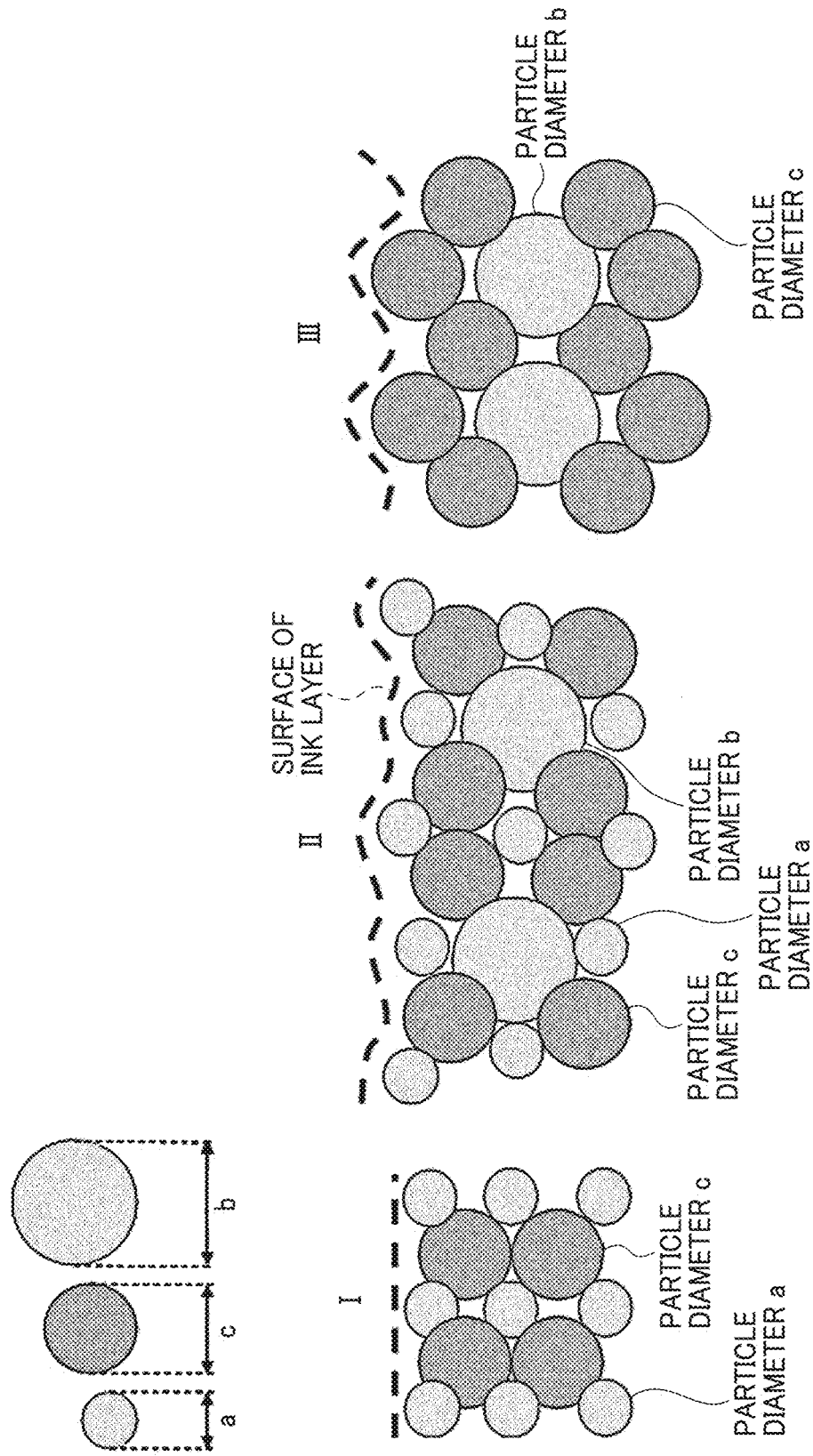
FIG. 3 is a diagram for explaining the action of the glittery ink according to an embodiment of the present invention.

FIG. 3 is a diagram illustrating a schematic model in which an ink layer is formed with resin particles having a particle diameter a, resin particles having a particle diameter b, and glittery pigment particles having a particle diameter c as described in 1 mentioned above. In the model the following relationships are satisfied, a≤c≤b and a<b.

The ink layer in the model I on the left side is constituted of the resin particles having a particle diameter a (hereinafter also referred to as small resin particles) and the glittery pigment particles having a particle diameter c. The ink layer in the model II at the center is constituted of the small resin particles, the resin particles having a particle diameter b (hereinafter also referred to as large resin particles), and the glittery pigment particles having a particle diameter c. The ink layer in the model III on the right side is constituted of the large resin particles and the glittery pigment particles having a particle diameter c. The mixing ratio of the resin to the pigment is the same for comparison.

To obtain an ink layer of the glittery ink having a high gloss, it is desirable to strike a balance between flatness and conductivity at a high level.

Mixing resin particles with glittery ink is preferable to firmly attach an ink layer with a recording medium; however, there is a trade-off between the attachability and the glitter. In fact, when resin particles have a high proportion, the conductivity deteriorates, thereby degrading the glitter. A suitable mixing ratio of pigments and resin particles is thus required to strike a balance between the glitter and the attachability.

Reflecting this requirement, the model I is considered to have a highly flat surface since the small resin particles having a particle diameter a are mixed. However, since electrical conduction is likely to be severely severed, the ratio of the small resin particles is reduced to maintain high conductivity. When the mixing ratio of the resin particles decreases, the glossiness is enhanced but the attachability deteriorates.

It is thus difficult to strike a balance between the glossiness and the attachability.

On the other hand, the glittery pigment in the model III is considered to have good conductivity among the glittery pigment particles because of the large resin particles having a particle diameter b. However, the flatness is degraded. The proportion of the large resin particles having a particle diameter b is thus reduced to obtain a good flatness. However, when the mixing ratio of the resin particles decreases, the attachability deteriorates. Even when the proportion of the large particles is reduced to zero, the flatness is not enhanced any more than that of an ink layer formed of the glittery pigment alone. Therefore, that flatness is not above that of the ink layer containing the small resin particles.

It is thus difficult to strike a balance between the glossiness and the attachability.

The model II is the glittery ink of the present disclosure. In the model II, the resin particles have two or more peaks in a particle size distribution as measured by a dynamic light scattering particle size distribution measuring device. The resin particles having a particle diameter correspond to the minimum of the two or more peaks and the resin particles having a particle diameter b correspond to the maximum of the two or more peaks. The particle diameter c of the glittery pigment corresponds to the peak of the maximum particle number of particles in a particle size distribution as measured by a dynamic light scattering particle size distribution measuring device.

In the model II, the resin particles having a particle diameter a, the resin particle having a particle diameter b, and the glittery pigment particles having a particle diameter c are mixed.

The model II is the mixed version of the model I and the model III. It achieves higher conductivity than the model I and better flatness than the model III at the same ratio of the pigment to the resin. The model II can strike a balance between the flatness and the conductivity when the pigment resin particle ratio is determined to secure the minimum attachability while fixing the resin proportion. Striking a balance between both the properties can be achieved with resins at a smaller proportion The model II has a freedom of designing a formulation in more ways than the model I and the model III.

A formulation for striking the balance better is possible by including the small resin particles and the large resin particles with the glittery pigment particles having a particle diameter c therebetween.

When the pigment resin particle ratio is determined constant to secure the attachability while fixing the resin proportion, the glittery ink of the model II of the present disclosure can demonstrate higher gloss and better attachability than the model I including the small resin particles alone and the model III including the large resin particles alone.

In the present disclosure, a device for mixing the small resin particles, the large resin particles, and the glittery pigment particles having a particle diameter c at a suitable ratio is used to satisfy the relationships $a \leq c \leq b$ and $a < b$.

Figure 4:
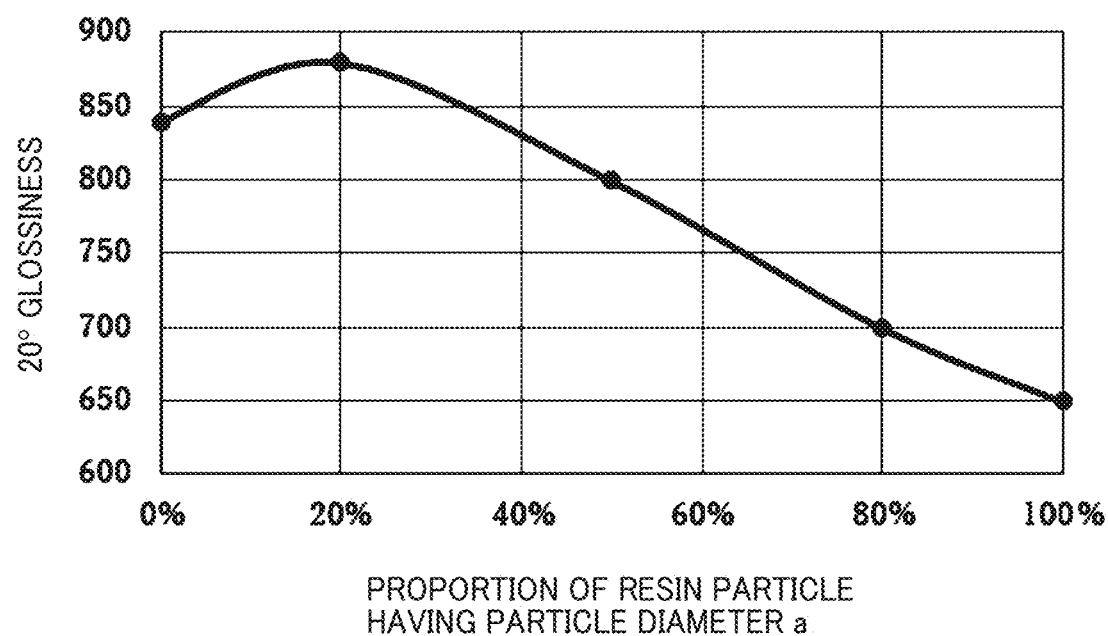
FIG. 4 is a graph demonstrating the relationship between the proportion of the resin particle having a particle diameter a measured in Examples described later and the gloss.

FIG. 4 is a graph demonstrating the relationship between the proportion of the resin particle having a particle diameter a measured in Examples, which are described later, and gloss.

In FIG. 4, the proportion of the small resin particles at 100 percent corresponds to the model I and the proportion of the large resin particles at 100 percent corresponds to the model III. As seen in FIG. 4, the model II containing the small resin particles, the large resin particles, and the glittery pigment particles having a particle diameter c has a suitable range of formulation for achieving a high gloss.

The proportion of the resin particles to the glittery pigment particles and the proportion of the small resin particles to the large resin particles are determined based on the average particle diameter of the glittery pigment particles, the average particle diameter of the resin particles, and the attachability. A suitable range for the proportion is determined as described below.

In the present disclosure, the resin particles having a particle diameter a and the resin particle having a particle diameter b are made of the same or different resins. When both resin particles are made of different resins, each of the resin particles can have has desired features on their own.

In the present disclosure, the resin particles are preferably a mixture of two or more types of resin particles having different number average particle diameters, wherein the two or more types of resin particles contain one or more types of resin particles 1 having a number average particle diameter smaller than the number average particle diameter of the glittery pigment and one or more types of resin particles 2 having a number average particle diameter greater than the number average particle diameter of the glittery pigment. In such a configuration, the dispersion stability of the resin particles is enhanced so that the number of particles is not readily changed, thereby enhancing the glossiness.

In the present disclosure, it is preferable that the number average particle diameter of the resin particles 1 be by 10 nm or more smaller than the number average particle diameter of the glittery pigment particles and the number average particle diameter of the resin particles 2 be by 10 nm or more greater than the number average particle diameter of the glittery pigment particles. Ink layers are likely to be flat due to the presence of the resin particles 1 at a certain resin proportion. High conductivity is achieved due to the presence of the resin particles 2.

The mass proportion of the resin particles 1 (resin particles having a smaller number average particle diameter than that of the glittery pigment particles) to the resin particles 2 (resin particles having a larger number average particle diameter than that of the glittery pigment particles) is preferably from 1:18 to 1:1 and more preferably from 1:9 to 3:7.

The resin particle preferably has a number average particle diameter of from 5 to 100 nm and more preferably from 10 to 30 nm. When the number average particle diameter is from 5 to 30 nm, it is possible to optimally strike a balance between the metallic luster (glossiness) and abrasion resistance of coated film. When the particle size is 10 nm or more, the abrasion resistance improves, and when it is 100 nm or less, the discharging stability improves.

The resin particle has no particular limit and can be suitably selected to suit to a particular application. Specific examples include, but are not limited to, polyurethane resin particles, polyester resin particles, acrylic resin particles, styrene resin particles, butadiene resin particles, styrene-butadiene resin particles, acrylic styrene resin particles, and acrylic silicone resin particles. These resin particles can be used alone or two or more types can be used in combination. Of these, polyurethane resin particles and polyester resin particles are preferable to enhance the abrasion resistance of printed matter.

Since the polyurethane resin chains provide high viscoelasticity to resin, the abrasion resistance improves in comparison with the proportion of polyurethane resin particles.

Examples of the polyurethane resin particle include, but are not limited to, polycarbonate urethane resin particles, polyester urethane resin particles, and polyether urethane resin particles.

Since the polycarbonate resin chains provide high rigidity to resin, the abrasion resistance of a glittery ink improves in comparison with the proportion of the polycarbonate resin.

Inclusion of polyester urethane resin particles and polyether urethane resin particle in glittery ink enhances a high abrasion resistance in comparison with their proportions. Since the polyester resin chain and the polyester resin chain are polar, the present inventor infers that their inclusion in glittery ink enhances its attachability to a recording medium due to the hydrogen bond.

Of these, polyester urethane resin particles are preferable.

The polyurethane resin particles are preferably synthetic polyurethane resin particles using a polyol.

The polyol is not particularly limited and can be suitably selected to suit to a particular application. An example is a polyester polyol.

As described above, two different types of resin particles can be used in the present disclosure.

It is preferable to combine resin particles having a high glitter such as urethane resin particles and resin particles having a high attachability such as polyester resin particles, polyether resin particles, and polycarbonate resin particles.

The resin particles enhance the abrasion resistance because they improve the dispersibility of the particles in glittery ink and the hardness of the coated film of glittery ink. The proportion of the resin particles in glittery ink is preferably the same volume or less against the entire volume of the pigment. A proportion of the resin particles to glittery ink of 5.0 percent by mass or less enhances the storage stability, discharging stability, and exhibition of glossiness of the ink. As the resin proportion increases, the glossiness and mirror image clarity deteriorate. The proportion of the resin particles in glittery ink is thus more preferably from 0.1 to 2.0 percent by mass.

When the resin particles are dispersed in an aqueous medium, it is possible to use a forcible emulsification type using a dispersant. However, since the strength of a coated film weakens due to the dispersant remaining in the film, it is preferable to use so-called self-emulsification type having an anionic group in its molecular structure.

The acid value of the anionic group of the self-emulsification resin particle is preferably from 5 to 100 mgKOH/g and more preferably from 5 to 50 mgKOH/g in terms of water dispersibility, abrasion resistance, and chemical resistance.

Specific examples of the anionic group include, but are not limited to, a carboxyl group, carboxylate group, sulfonic acid group, and sulfonate group. Of these, a carboxylate or sulfonate group which is partially or entirely neutralized by a basic compound is preferable to maintain good water dispersion stability. To introduce this anionic group into resin, it is suitable to use a monomer having the anionic group.

A water dispersion of resin particles having the anionic group is manufactured by adding a basic compound for neutralizing the anionic group to a water dispersion.

Specific examples of the basic compound include, but are not limited to, organic amines such as ammonium, triethyl amine, pyridine, and morpholine, alkanol amine such as monoethanol amine, and metal salt compounds containing Na. K. Li, Ca, etc. These can be used alone or in combination.

To prepare a water dispersion using the resin particle of the forced emulsification type, a surfactant such as a nonionic surfactant and an anionic surfactant can be used. These can be used alone or in combination. Of these, nonionic surfactants are preferable in terms of water resistance.

Specific examples of the nonionic surfactants include, but are not limited to, polyoxyethylene alkyl ether, polyoxyethylene alkylene alkyl ether, polyoxyethylene derivatives, polyoxyethylene aliphatic acid esters, polyoxyethylene polyol aliphatic acid ester, polyoxyethylene propylene polyol, sorbitan aliphatic acid ester, polyoxyethylene curable ricinus, polyoxyalkylene polycyclic phenyl ether, polyoxyethylene alkyl amine, alkyl alkanol amide, and polyalkylene glycol (meth)acrylate. These can be used alone or in combination. Of these, polyoxyethylene alkylether, polyoxyethylene aliphatic acid esters, polyoxyethylene sorbitan aliphatic acid ester, and polyoxyethylene alkylamine are preferable.

Specific examples of the anionic surfactants include, but are not limited to, alkyl sulfuric acid ester salts, polyoxyethylene alkyl ether sulfuric acid salts, alkyl benzene sulfonic acid salts, α-olefine sulfonic acid salts, methyl lauryl acid salts, sulfosuccinic acid salts, ether sulfonic acid salts, ether carboxylic acid salts, aliphatic acid salts, naphthalene sulfonic acid formalin condensed compounds, alkyl amine salts, quaternary ammonium salts, alkyl betaine, and alkyl amine oxide. These can be used alone or in combination. Of these, polyoxyethylene alkylether sulfuric acid salts and sulfosuccinic salts are preferable.

The proportion of the surfactant to the entire resin particles is preferably from 0.1 to 30 percent by mass and more preferably from 5 to 20 percent by mass. An ink having a surfactant in a proportion of from 0.1 to 30 percent by mass suitably forms resin film having excellent attachability and water resistance so that printed matter obtained is free of blocking.

The number average particle diameter of resin particles are measured in the present disclosure as follows.

First, a frozen body is made from several µl of ink by high pressure freezing. A carbon replica film of a cross section obtained by cutting the frozen body is manufactured. The replica film is placed in a grid for a transmission electron microscope (TEM). The major diameter of resin particles in an area of 5 µm×5 µm of an obtained TEM image is measured and the calculated average is determined as the number average particle diameter particle diameter of the resin particles.

As described above, the particle size distribution of the resin particle in the present disclosure is measured by the following dynamic light scattering particle size distribution measuring device. The particle size distribution of the resin particle is measured by Pade-Laplace analysis using a dynamic light scattering concentrated highly-sensitive particle size analyzer (VASCO$^Y$ manufactured by CORDOUAN Technologies). From the histogram illustrating the particle size distribution, the minimum particle diameter a and the maximum particle diameter b among the particle diameters corresponding to the peaks are identified. The count width of the histogram is 5 nm or less and preferably 1 nm or less regarding the resolution. The measurements are repeated to the degree of precision that σ3 is +2 nm.

Method of Manufacturing Polyurethane Resin Particle

The polyurethane resin particle can be manufactured by typical manufacturing methods. For example, the following method is suitable.

First, a urethane prepolymer having an isocyanate group at its distal end is prepared under the presence of no solvent or an organic solvent through the reaction of the polyol and the polyisocyanate with an equivalent ratio in which isocyanate groups are excessive.

Next, optionally the anionic group in the urethane prepolymer having an isocyanate group at its distal end is neutralized by a neutralizer. Thereafter, subsequent to reaction with a chain elongating agent, the organic solvent in the system is removed if necessary to obtain the urethane resin particle.

Specific examples of the organic solvent for use in manufacturing the polyurethane resin particle include, but are not limited to, ketones such as acetone and methylethyl ketone; ethers such as tetrahydrofuran and dioxane, acetic acid esters such as ethyl acetate and butylacetate, nitriles such as acetonitrile, and amides such as dimethyl formamide, N-methyl pyrrolidone, and N-ethyl pyrrolidone. These can be used alone or in combination.

Polyamines or other compounds containing an active hydrogen group can be used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isophorone diamine, 4,4'-dicyclohexyl methane diamine, and 1,4-cyclohexane diamine, polyamines such as diethylene triamine, dipropylene triamine, and triethylene tetramine, hydrazines, hydrazines such as N,N' dimethyl hydrazine and 1,6-hexamethylene bis hydrazine, and dihydrazides such as succinic dihydrazide, adipic acid dihydrazide, glutaric acid dihydrazide, sebacic acid dihydrazide, and isophthalic acid dihydrazide. These can be used alone or in combination.

Specific examples of the other compounds having active hydrogen groups include, but are not limited to, glycols such as ethylene glycol, diethylene glycol, triethylene glycol, propylene glycol, 1,3-propane diol, 1,3-butane diol, 1,4-butane diol, hexamethylene glycol, saccharose, methylene glycol, glycerin, and sorbitol, phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone, and water. These can be used alone or in combination unless the storage stability of the ink is degraded.

As the polyurethane resin particle, polycarbonate-based polyurethane resin particles are preferable in terms of water resistance, heat resistance, abrasion resistance, weathering resistance, and scratch resistance of images due to high agglomeration power of carbonate groups. In the case of polycarbonate-based polyurethane resin particle, obtained ink is suitable for printed matter for use in severe conditions like outdoor use.

The polyurethane resin particle can be procured. Specific examples include, but are not limited to, UCOAT UX-485 (polycarbonate-based polyurethane resin particles), UCOAT UWS-145 (polyester-based polyurethane resin particles), PERMARIN UA-368T (polycarbonate-based polyurethane resin particles), and PERMARIN UA-200 (polyether-based polyurethane resin particles) (all manufactured by Sanyo Chemical Industries, Ltd.). These can be used alone or in combination.

In the present disclosure, the resin particles 1 preferably have a thermosoftening temperature lower than that of the resin particles 2 to achieve a higher gloss.

The present inventor infers that the following way of filming an ink layer explains this relationship about the thermosoftening temperature.

Inferentially, resin particles having lower thermosoftening temperatures soften first and gather to make a film. When resin particles having different thermosoftening temperatures are mixed, there is a slight time difference in film-forming among the resin particles. In such a combination, the small resin particles soften and gather first. Consequently, separated pigments quickly assemble so that the connection between the glittery pigment particles becomes good, which leads to good conductivity. The glittery pigment particles are positionally fixed by the large resin particles that have formed film, which prevents the small resin particles from entering between the glittery pigment particles. Thereafter, the resin particles having a lower Tg form film, which fixes both of the pigment and resin. When the resin particles 1 have a higher Tg than that of the resin particles 2, the gaps are filled well and the film is leveled, thereby forming an ink layer having a flat surface. Therefore, the ink layer strikes a balance between the flatness and the conductivity at a high level, which enhances the glossiness of the ink layer.

Glittery Pigment

The glittery ink of the present disclosure contains a glittery pigment. Any pigment is suitably used as the glittery pigment as long as ink droplets containing the pigment can be discharged by inkjet printing. The glittery pigment glitters when it is attached onto a recording medium.

Examples of such a glittery pigment include, but are not limited to, a pearl pigment and metal particles. Representative examples of the pearl pigment include, but are not limited to, pigments having pearly luster or interference luster, such as titanium dioxide-coated mica, fish scale foil, and bismuth oxychloride. Specific examples of the metal particles include, but are not limited to, particles of aluminum, silver, gold, platinum, nickel, chromium, tin, zinc, indium, titanium, and copper. Particles made of at least one member selected from the group consisting of such elementary metals, alloys thereof, and mixtures thereof may be used. The glittery pigment for use in this embodiment is practically effective irrespective of the type of pearl pigments or metal particles. However, it is preferable to use silver particles in terms of the level of glitter. Silver ink is used to describe an example of the ink containing a glittery pigment but the present disclosure is not limited to the silver ink.

Silver Particle

Silver particles can create an image having excellent metallic gloss.

The proportion of silver particles in glittery ink is preferably from 2 to 10 percent by mass. A proportion of 2 percent by mass or more provides sufficient gloss. A proportion of 10 percent by mass or less ameliorates the discharging stability.

The surface of a silver particle preferably has an arithmetic mean roughness Ra of 10 nm or less. The conditions for producing such extremely fine particles are to:
(1) set the concentration of silver oxalate in a liquid dispersion within a predetermined range;
(2) use a particular dispersant;
(3) set the pressure during heating to a predetermined range; and
(4) set the rate of stirring in a predetermined range.

The standard deviation σD of the diameter D of such particles is preferably 10 μm or less. The average thickness Tave of these particles is preferably from 1 to 100 nm. The aspect ratio (D50 to Tave) of these particles is preferably from 20 to 1000. As the aspect ratio of pigments contained in glittery ink increases, the printing layer becomes flat and the glossiness and mirror image clarity are enhanced. An aspect ratio of 1000 or less enhances the discharging stability of an inkjet head. An aspect ratio of 20 or more reduces the roughness of the surface of an ink layer and enhances the glossiness and mirror image clarity.

The arithmetic mean roughness Ra is measured by an atomic force microscope (AFM). The AFM is a type of scanning probe microscope. The AFM has a cantilever and a probe mounted onto the tip of the cantilever. This probe scans the surface of a microparticle. The cantilever is vertically displaced by the force acting between atoms of the sample and the probe. This displacement is measured.

In the present disclosure, for instance. "SPM-9600" manufactured by Shimadzu Corporation is used as the AFM. The measurement conditions are as follows:
  Mode: Contact mode
  Cantilever: OMCL-TR 800PSA-1 manufactured by Olympus Corporation
  Resolution: 512×512 pixels
  Height resolution: 0.01 nm
  Lateral resolution: 0.2 nm
  Dispersant A dispersant preferable for silver particles is a glycol-based dispersant. Due to the liquid dispersion containing a glycol-based surfactant, particles having a sharp particle size distribution can be obtained. From this liquid dispersion, particles having a small arithmetic average roughness Ra are obtained. From this liquid dispersion, particles having a large aspect ratio (D50 to Tave) can be obtained. Furthermore, the particles produced from this liquid dispersion are sufficiently dispersed in a solvent. A particularly preferable dispersant is polyethylene glycol.

The pressure during the decomposition reaction of silver oxalate is preferably higher than the atmospheric pressure.

By the decomposition reaction in this atmosphere, particles having a sharp particle size distribution can be obtained. Moreover, from this decomposition reaction in this atmosphere, particles having a small arithmetic average roughness Ra are obtained. From these point of view, this pressure is preferably 2 kgf/cm² or higher. This pressure is preferably 10 kgf % cm² or less.

The rate of stirring during the decomposition of silver oxalate is preferably 100 rpm or more. Aggregation of the microparticles is reduced at a rate of stirring of 100 rpm or more. Therefore, particles having a sharp particle size distribution can be obtained. Furthermore, particles having a large aspect ratio (D50 to Tave) can be obtained at a rate of stirring of 100 rpm or more. From these points of view, the rate of stirring is preferably 130 rpm or more. The rate of stirring is preferably 1000 rpm or less.

The temperature of the liquid dispersion during the decomposition of silver oxalate is preferably 100 degrees C. or higher. At 100 degrees C. or higher, the reaction is completed in a short time in a liquid dispersion. From this point of view, the temperature is particularly preferably 120 degrees C. or higher. From energy cost point of view, this temperature is preferably 150 degrees C. or lower.

Examples of the solvents for dispersoid include, but are not limited to, alcohols such as aliphatic alcohols, alicyclic alcohols, aromatic aliphatic alcohols, and polyhydlic alcohols, glycol ethers such as (poly)alkylene glycol monoalkyl ethers and (poly)alkylene glycol monoaryl ethers, glycol esters such as (poly)alkylene glycol acetates, glycol ether esters such as (poly)alkylene glycol monoalkyl ether acetate: hydrocarbons such as aliphatic hydrocarbons and aromatic hydrocarbons, esters; ethers such as tetrahydrofuran and diethylether; and amides such as dimethylformamide (DMF), dimethylacetamide (DMAC), and N-methyl-2-pyrrolidone (NMP). Two or more solvents may be used in combination.

Silver Colloidal Particle

The silver particle mentioned above may be dispersed in an aqueous dispersion medium as silver colloid having protective colloid attached to the surface thereof. Due to this, dispersion property of the silver particle to the aqueous dispersion medium is particularly excellent, thereby significantly improving storage stability of ink.

The silver colloid can be prepared by any method. For example, it can be obtained by preparing a solution containing silver ion and reducing this silver ion with a reducing agent under the presence of a protective colloid as described in, for example, Japanese Unexamined Patent Application Publication No. 2006-299329. When manufacturing a metal colloid by these methods, a surfactant added to an aqueous solution at any moment before or after the reduction reaction further improves the dispersion stability of metal particles.

The volume average particle diameter of the silver particle can be controlled by controlling the reduction reaction.

That is, it is possible to control the speed of adding the reducing agent and the reaction temperature. For example, the particle size can be made small by slowing down the speed of adding a reducing agent and lowering the liquid temperature.

The protective colloid protects the surface of the silver particle. For example, organic compounds having a carboxyl group or dispersant polymers are preferable. These can be used alone or in combination, and the combinational use is more preferable to achieve a synergy effect.

Organic Compound Having Carboxyl Group

The number of carboxyl groups in the organic compound having a carboxyl group is at least one per molecule and can be suitably selected to suit to a particular application. For example, it is preferably from 1 to 10, more preferably from 1 to 5, and particularly preferably from 1 to 3.

In the organic compound having a carboxylic group, all or part of carboxylic groups may form salts (salts with amine, metal salts, etc.). In the present disclosure, it is possible to suitably use organic compounds having isolated carboxyl groups, in which the carboxyl groups (in particular, all the carboxyl groups) do not form salts (in particular, salts with basic compounds such as salts with amine or amine salts).

The organic compound can be suitably selected to suit to a particular application as long as it contains a carboxyl group. Also, it may include a functional group (or coordinating group to metal compound or metal nano particle) other than a carboxyl group.

Specific examples of such functional groups (or coordinating group) other than carboxyl group include, but are not limited to, groups (or functional groups) containing at least one hetero atoms selected from the group consisting of halogen atoms (fluorine atom, chlorine atom, bromine atom, iodine atom, etc.), nitrogen atom, oxygen atom, and sulfur atom, for example, groups having nitrogen atoms such as amino group, substituted amino group (e.g., dialkyl amino group), imino group (—NH—), nitrogen-containing cyclic groups such as 5 to 8 membered nitrogen-containing heterocyclic groups such as pyridyl group, carbazol group, morphonyl group), amide group (—CON<), cyano group, and nitro group, groups containing oxygen atoms such as hydroxy group, alkoxy group (such as alkoxy groups having 1 to 6 carbon groups such as methoxy group, ethoxy group, propoxy group, and butoxy group), formyl groups, carbonyl groups (—CO—), ester group (—COO—), and oxygen-containing cyclic groups (such as 5 to 8 membered oxygen-containing cyclic groups such as tetrahydropyranyl group), groups containing sulfur atoms such as thio group, thiol group, thiocarbonyl group (—SO—), alkylthio group (such as alkylthio groups having one to four carbon atoms such as methylthio group and ethylthio group), sulfo group, sulfamoyl group, and sulfinyl group (—$SO_2$—), and groups forming these salts such as ammonium salt group). These groups can be contained alone or in combination in the organic compounds containing carboxylic group.

The organic compound containing carboxylic group is preferably free of a basic group, in particular, an amino group, substituted amino group, imino group, or ammonium salt group, that can form a salt with a carboxyl group.

A representative organic compound containing a carboxyl group is a carboxyl acid. Examples include, but are not limited to, monocarboxylic acids, polycarboxylic acids, and hydroxy carboxylic acids (or oxycarboxylic acids).

Specific examples of the monocarboxylic acid include, but are not limited to, aliphatic monocarboxylic acids (saturated aliphatic monocarboxylic acids such as those having 1 to 34 carbon atoms, preferably 1 to 30 carbon atoms such as acetic acid, propionic acid, butylic acid, caprylic acid, caproic acid, hexanoic acid, capric acid, lauric acid, myristic acid, cyclohexane carboxylic acid, dehydrocholic acid, and cholanic acid), unsaturated aliphatic monocarboxylic acid (such as those having 4 to 34 carbon atoms, preferably 10 to 30 carbon atoms, such as oleic acid, erucic acid, linolic acid, and abietic acid), and aromatic monocarboxylic acids (such as those having 7 to 12 carbon atoms such as benzoic acid and naphthoic acid).

Specific examples of the polycarboxylic acid include, but are not limited to, aliphatic polycarboxylic acids (saturated aliphatic polycarboxylic acids such as those having 2 to 14 carbon atoms, preferably 2 to 10 carbon atoms such as oxalic acid, malonic acid, succinic acid, glutaric acid, adipic acid, azelaic acid, sebacic acid, and cyclohexane dicarboxylic acid), unsaturated aliphatic polycarboxylic acid (such as those having 4 to 14 carbon atoms, preferably 4 to 10 carbon atoms, such as maleic acid, fumaric acid, itaconic acid, sorbic acid, and tetrahydrophthalic acid), and aromatic polycarboxylic acids (such as those having 8 to 12 carbon atoms such as phthalic acid and trimellitic acid).

Specific examples of the hydroxycarboxylic acid include, but are not limited to, hydroxymonocarboxylic acid (such as aliphatic hydroxymonocarboxylic acid such as those having 2 to 50 carbon atoms, preferably 2 to 34 carbon atoms, and more preferably 2 to 30 carbon atoms such as glycolic acid, lactic acid, oxybutylic acid, glyceric acid, 6-hydroxyhexanoic acid, cholic acid, deoxycholic acid, chenodeoxycholic acid, 12-oxochenodeoxycholic acid, glycocholic acid, lithocholic acid, hyodeoxycholic acid, ursodeoxycholic acid, apocholic acid, and taurocholic acid, aromatic hydroxy monocarboxylic acid (such as those having 7 to 12 carbon atoms such as salicylic acid, oxybenzoic acid, and gallic acid, and hydroxypolycarboxylic acids (such as those having 2 to 10 carbon atoms, such as aliphatic hydroxypolycarboxylic acids such as tartronic acid, tartaric acid, citric acid, and malic acid).

Those carboxylic acids are allowed to form salts and may be anhydrides or hydrates. In many cases, as described above, the carboxylic acid does not form a salt in particular with a basic compound such as a salt with an amine.

These organic compounds having carboxylic acid can be used alone or in combination. As the organic compound having a carboxyl group, hydroxy carboxylic acids are preferable such as aliphatic hydroxy carboxylic acids (aliphatic hydroxymonocarboxylic acids and aliphatic hydroxypolycarboxylic acids).

As the aliphatic hydroxy carboxyl group, alicyclic hydroxy carboxylic acids or hydroxycarboxylic acid having an alicyclic backbone are preferable. As the alicyclic hydroxy carboxylic acid or hydroxycarboxylic acid having an alicyclic backbone, alicyclic hydroxy carboxylic acids having 6 to 34 carbon atoms such as cholic acid are preferable. Alicyclic hydroxy carboxylic acids having 10 to 34 carbon atoms are preferable, and alicyclic hydroxy carboxylic acids having 16 to 30 carbon atoms are particularly preferable.

Polycyclic aliphatic hydroxy carboxylic acid such as cholic acid (such as condensation polycyclic aliphatic hydroxy carboxylic acid, preferably condensation polycyclic aliphatic hydroxy carboxylic acid having 10 to 34 carbon atoms, more preferably condensation polycyclic aliphatic hydroxy carboxylic acid having 14 to 34 carbon atoms, and particularly preferably condensation polycyclic aliphatic hydroxy carboxylic acid having 18 to 30 carbon atoms), polycyclic aliphatic carboxylic acids (for example, condensation polycyclic aliphatic carboxylic acids, preferably, condensation polycyclic aliphatic carboxylic acid having 10 to 34 carbon atoms, more preferably condensation polycyclic aliphatic carboxylic acid having 14 to 34 carbon atoms, particularly preferably condensation polycyclic aliphatic carboxylic acid having 18 to 30 carbon atoms, such as dehydrocholic acid and cholic acid (such as condensation polycyclic aliphatic carboxylic acid having 10 to 50 carbon atoms, preferably condensation polycyclic aliphatic carboxylic acid having 12 to 40 carbon atoms, more preferably condensation polycyclic aliphatic carboxylic acid having 14 to 34 carbon atoms, and particularly preferably condensation polycyclic aliphatic carboxylic acid having 18 to 30 carbon atoms. These have bulky structure so that agglomeration of silver particles can be significantly reduced, which is preferable.

The number average molecular weight of the organic compound having a carboxyl group is, for example, 1,000 or less (for example, about 46 to about 900), preferably 800 or less (for example, about 50 to about 700), and more preferably 600 or less (for example, about 100 to about 500).

The pKa value of the organic compound having a carboxyl group is, for example, 1 or greater (for example, about 1 to about 10) and preferably 2 or greater (for example, about 2 to about 8). The volume average molecular weight can be measured by, for example, gel permeation chromatography (GPC).

Dispersant Polymer

In the present disclosure, the protective colloid is preferably constituted of a combination of the organic compound having a carboxyl group and the dispersant polymer. Such a constitution of protective colloid assists in obtaining a silver colloid containing silver particles in an extremely small amount of coarse particles. Due to this particular combination of the protective colloid, even a small proportion of coarse particles increases the proportion of silver particles and the storage stability of silver colloid or its liquid dispersion improves.

The dispersant polymer has no particular limit as long as it covers silver particles. Amphiphatic dispersant polymers or oligomer type dispersants are preferable.

Examples are those used to disperse a colorant in paint and ink.

Specific examples include, but are not limited to, styrene-based resin (styerene-(meth)acrylic acid copolymer, styrene-maleic anhydride copolymer, etc.), acrylic resins (methyl (meth)acrylate-(meth)acrylic acid copolymer, etc.), water-soluble urethane resins, water-soluble acrylic urethane resins, water-soluble epoxy resins, water-soluble polyester-based resins, cellulose derivatives (nitrocellurose, alkylcellulose such as ethylcellulose, akyl-hydroxyalkyl cellulose such as ethylhydroxyethyl cellulose, hydroxyalkylcellulose such as hydroxyethyl cellulose and hydroxy propyl cellulose, cellulose ethers of carboxyalkyl cellulose such as carboxymethyl cellulose), polyvinyl alcohol, polyalkylene glycol (liquid polyethylene glycol, polypropylene glycol, etc.), natural polymers (gelatin, dextrin, etc.), polyethylene sulfonate, and formalin condensation products of naphthalene sulfonic acid. These can be used alone or in combination.

Representative amphiphatic dispersant polymers are resins, water-soluble resins, or water-dispersible resins, which includes a hydrophilic unit or block constituted of a hydrophilic monomer.

Specific examples of the hydrophilic monomer include, but are not limited to, monomers for addition polymerization such as monomers containing carboxyl group or acid anhydride (for example, (meth)acrylic monomers such as acrylic acid and methacrylic acid, unsaturated polycarboxylic acids such as maleic acid, and maleic anhydride) and monomers containing hydroxyl group (hydroxyalkyl(meth)acrylate such as 2-hydroxyethyl(meth)acrylate, and vinylphenol); and monomers for condensation polymerization such as alkylene oxide (such as ethylene oxide).

The monomer for condensation polymerization may form a hydrophilic unit through reaction with an active group (for example, hydroxyl group-containing monomers) such as hydroxyl group). The hydrophilic monomer may form a hydrophilic unit alone or in combination.

The dispersant polymer includes at least a hydrophilic unit or block. It can be a mono polymer or copolymer of a hydrophilic monomer such as polyacrylic acid or a salt thereof. Also, like the styrene-based resins or acrylic resins specified above, it can be a copolymer of a hydrophilic monomer and a hydrophobic monomer.

Specific examples of the hydrophobic monomer (nonionic monomer) include, but are not limited to, (meth)acrylic monomers such as (meth)acrylate {(meth)acrylic acid of alkyl having 1 to 20 carbon atoms such as methyl(meth) acrylate, ethyl(meth)acrylate, n-butyl(meth)acrylate, 2-ethylhexyl(meth)acrylate, lauryl(meth)acrylate, and stearyl (meth)acrylate, (meth)acrylic acid cycloalkyl such as cyclohexyl(meth)acrylate, aryl(meth)acrylate such as phenyl(meth)acrylate, benzyl(meth)acrylate, and aralkyl(meth) acrylate such as 2-phenylethyl(meth)acrylate}, styrene-based monomers such as styrene. α-methylstyrene, and vinyltoluene, olefin-based monomers such as α-olefin having 2 to 20 carbon atoms (such as ethylene, propylene, 1-butene, isobutylene, 1-hexene, 1-octen, and 1-dodecene), carboxylic acid vinylester-based monomers such as vinyl acetate and vinyl butylate. The hydrophobic monomer may form a hydrophobic unit alone or in combination.

When the dispersant polymer is a copolymer, for example, a copolymer of a hydrophilic monomer and a hydrophobic monomer, the copolymer is allowed to be a random copolymer, an alternate copolymer, a block copolymer (for example, a copolymer of a hydrophilic block constituted of a hydrophilic monomer and a hydrophobic block constituted of a hydrophobic monomer), or a comb copolymer (or comb graft copolymer).

The structure of the block copolymer is allowed to have a diblock structure or triblock structure (ABA type and BAB type).

In addition, in the comb-like copolymer, the main chain may be constituted of the hydrophilic block, the hydrophobic block, or the hydrophilic block and the hydrophobic block.

In addition, the hydrophilic unit may be constituted of, for example, condensation-based block such as hydrophilic block (polyethyleneoxide, polyalkylene oxide such as polyethyleneoxide-polypropylene oxide) constituted of alkyleneoxide (ethylene oxide, etc.).

The hydrophilic block such as polyalkylene oxide and the hydrophobic block (such as polyolefin block are allowed to be bonded via a coupling group such as ester bond, amide bond, ether bond, and urethane bond. To form this bond, a hydrophobic block such as polyolefin is modified by a modifier such as unsaturated carboxylic acid or anhydride thereof such as maleic anhydride, lactam or aminocarboxylic acid, hydroxyl amine, and diamine and thereafter the hydrophilic block is introduced.

It is allowed to form a comb copolymer having the main chain constituted of a hydrophobic block as a result of the reaction or bond between a polymer obtained from a monomer such as the hydroxylalkyl(meth)acrylate having a hydrophilic group such as hydroxyl group and carboxyl group and the condensation-based hydrophilic monomer such as ethylene oxide group.

Moreover, using a hydrophilic nonionic monomer as the copolymerization component is allowed to balance the hydrophobicity and the hydrophilicity.

Such a component includes a monomer or oligomer including an alkyleneoxy (in particular ethyleneoxy) unit such as 2-(2-methoxyethoxy)ethyl(meth)acrylate and polyethylene glycol monomethacrylate having a number average molecular weight of from 200 to 1,000.

In addition, a hydrophilic group such as a carboxyl group is modified, for example, esterified to balance the hydrophilicity and the hydrophobicity.

The dispersant polymer may include a functional group.

Examples of the functional group include acid groups or acidic group such as carboxyl groups or acid anhydride groups, sulfo groups such as sulfonic acid groups, and hydroxyl groups. The dispersant polymer may contain these functional groups alone or in combination. The functional group preferably has an acid group, in particular a carboxyl group.

In addition, when the dispersant polymer includes acid groups such as carboxyl groups, all or part of the acid groups may form at least a salt including a salt with amine and metal salt, however, in the present disclosure, it is preferable to suitably use a dispersant polymer in which the acid groups such as the carboxyl groups, in particular, all the carboxyl groups, do not form a salt, in particular, a salt with a basic compound including a salt with amine or an amine salt. In other words, a dispersant polymer having an isolated acid group, in particular, carboxyl group, is preferable.

The acid value of the dispersant polymer having an acid group (in particular, carboxyl group) is, for example, preferably 1 mgKOH/g or greater (for example, 2 mgKOH/g to 100 mgKOH/g), more preferably 3 mgKOH/g or greater (for example, 4 mgKOH/g to 90 mgKOH/g), furthermore preferably 5 mgKOH/g or greater (for example, 6 mgKOH/g to 80 mgKOH/g), and particularly preferably 7 mgKOH/g or greater (for example, 8 mgKOH/g to 70 mgKOH/g). In addition, normally, it can be 3 mgKOH/g to 50 mgKOH/g (for example, 5 mgKOH/g to 30 mgKOH/g).

Note that, in the dispersant polymer having an acid group, the amine value is allowed to be zero (or almost zero).

In the dispersant polymer, the site of the functional group mentioned above is not particularly limited. It can be at the main chain or the side chain and both of the main chain and the side chain.

Such functional groups can be, for example, functional groups (for example, hydroxyl group) derived from a hydrophilic monomer or a hydrophilic unit. They can be introduced into a polymer through copolymerization of a copolymerizable monomer (such as maleic anhydride) having a functional group. These can be used alone or in combination. Polymer dispersants disclosed in Japanese Unexamined Patent Application Publication No. 2004-207558 can be used as the dispersant polymers.

It is possible to use any synthetic polymers or procurable products. Specific examples of the procurable dispersant polymer (or dispersant constituted of at least amphiphatic dispersant) include, but are not limited to, Solsperse series (manufactured by AvECIA GROUP) such as Solsperse 13240, Solsperse 13940, Solsperse 32550, Solsperse 31845, Solsperse 24000, Solsperse 26000, Solsperse 27000, Solsperse 28000, and Solsperse 41090; DISPERBYK series (manufactured by BYK-Chemie GmbH) such as DISPERBYK 160, DISPERBYK 161, DISPERBYK 162, DISPERBYK 163, DISPERBYK 164, DISPERBYK 166, DISPERBYK 170, DISPERBYK 180, DISPERBYK 182, DISPERBYK 184, DISPERBYK 190, DISPERBYK 191, DISPERBYK 192, DISPERBYK 193, DISPERBYK 194, DISPERBYK 2001, and DISPERBYK 2050; EFKA-46, EFKA-47, EFKA-48, EFKA-49, EFKA-1501, EFKA-1502, EFKA-4540, EFKA-4550, Polymer 100, Polymer 120, Polymer 150, Polymer 400, Polymer 401, Polymer 402, Polymer 403, Polymer 450, Polymer 451, Polymer 452, and Polymer 453 (available from EFKA Chemical Co., Ltd.); AJISPER series (manufactured by Ajinomoto Fine-Techno Co., Inc.) such as AJISPER PB711, AJISPER PA111, AJISPER PB811, AJISPER PB821, and AJISPER PW911, FLOWLEN series (manufactured by KYOEISHA CHEMICAL Co., LTD.) such as FLOWLEN DOPA-158, FLOWLEN DOPA-22, FLOWLEN DOPA-17, FLOWLEN TG-700, FLOWLEN TG-720W, FLOWLEN 730W, FLOWLEN 740W, and FLOWLEN-745W; and JONCRYL® series (manufactured by Johnson Polymer) JONCRYL® 678, JONCRYL® 679, and JONCRYL® 62.

Of these, specific examples of the dispersant polymer having an acid group include, but are not limited to, DISPERBYK 190 and DISPERBYK 194.

The volume average molecular weight of the dispersant polymer is preferably from 1,500 to 100,000, more preferably from 2,000 to 80,000 (for example, 2,000 to 60,000), furthermore preferably from 3,000 to 50,000 (for example, 5,000 to 30,000), and particularly preferably from 7,000 to 20,000. The volume average molecular weight can be measured by, for example, gel permeation chromatography (GPC).

Pigment Particle Diameter

The particle diameter of silver particles in the glittery ink of the present disclosure preferably has a volume average particle diameter (D50) of from 20 to 100 nm.

Due to such a pigment having a small particle diameter, the surface of a printed layer of printed matter can be made very smooth, thereby imparting a high level of luster.

The volume average particle diameter of silver particles in ink can be measured as follows.

First, a frozen body is made from several μl of ink by high pressure freezing. A carbon replica film of a cross section obtained by cutting the frozen body is manufactured. The replica film is placed in a grid a transmission electron microscope (TEM). The major diameter of silver particles in an area of 5 μm×5 μm of an obtained TEM image is measured to create a histogram and the calculated average is determined as the number average particle diameter particle diameter of the silver particles.

The particle size distribution of the glittery pigment in the present disclosure is measured by the following dynamic light scattering particle size distribution measuring device. The particle size distribution of the glittery pigment particle is measured by Pade-Laplace analysis using a dynamic light scattering concentrated highly-sensitive particle size analyzer (VASCO$^Y$ manufactured by CORDOUAN Technologies). From the histogram illustrating the particle size distribution, the particle diameter c corresponding to the peak of the maximum number of particles is identified. The count width of the histogram is 5 nm or less and preferably 1 nm or less regarding the resolution.

The measurements are repeated to the degree of precision that σ3 is +2 nm.

Pigment Concentration

The concentration of the glittery pigment in the glittery ink of the present disclosure is preferably from 1 to 10 percent by mass and more preferably from 2 to 7 percent by mass. When the concentration is 1 percent by mass or greater, sufficient gloss and mirror image clarity can be obtained. A proportion of 10 percent by mass or less secures the balance between the abrasion resistance and glossiness. To secure the glitter, it is suitable to reduce the amount of resin particles to the glittery pigment. At an excessively high concentration of the glittery pigment, the glittery pigment is insufficiently fixed on a recording medium by resin particles, thereby failing to secure the abrasion resistance. The concentration of the glittery pigment is suitable when the glittery pigment particles are directly covered with a recording medium at around 100 percent. The suitable concentration is approximately between 2 to 7 percent by mass although depending on the type of the pigment material, the pigment particle diameter, the form of the pigment, the ratio of the thickness to the area (in the case of tabular pigment), and the type of recording medium. As the glittery pigment concentration increases, the coverage ratio increases, so that the gloss increases. However, after the glittery pigment concentration reaches a degree that the coverage ratio of the recording medium by the glittery pigment is around 100 percent, the glossiness and the mirror image clarity do not increase much more even if the pigment concentration is further increased. Depending on the recording medium, the smoothness may be impaired and the gloss and the mirror image clarity may be lowered.

Water-Soluble Resin

The glittery ink of the present disclosure may contain a water-soluble resin. Specific examples of the water-soluble resin include, but are not limited to, polyvinyl alcohol (PVA), polyvinyl pyrrolidone, polyethylene oxide, polyacrylamide, and carboxymethyl cellulose (CMC).

It is also possible to contain a cross-linkable monomer such as carbodiimide, aziridine, and isocyanate. It is possible to form a robust printing layer by cross-linking resin particles in this formulation. Specific examples of the aqueous cross-linking agent having a hydrophilic segment added to a polycarbodiimide resin include, but are not limited to, Carbodiimides V-10 and V-12G (both manufactured by Nisshinbo Chemical Corp.).

Solvent-Soluble Resin

Dispersant

When the resin is soluble in a vehicle, the vehicle readily fills the gaps between the glittery pigment particles. Such a resin soluble in a vehicle enhances the fixability of coated ink film less than resin particles; however, they secure the dispersion stability of glittery pigment particles.

Aqueous ink is relatively safe and gains the favor of the market. Therefore, aqueous resin is particularly preferable as the vehicle-soluble resin.

It is possible to use a water-soluble polymer having an ionic hydrophilic group, such as an alkali metal salt, an ammonium salt, an inorganic acid salt, or an organic acid salt of a sulfonic acid group, a carboxylic acid group or an amino group. Such water-soluble polymers may be used alone or in combination of two or more of them.

Specific examples include, but are not limited to, a carboxymethyl cellulose salt, a cellulose derivative such as viscose, natural polymers such as an alginate, gelatin, albumin, casein, gum arabic, gum tragacanth and lignin sulfonate, starch derivatives such as cationic starch, phosphate starch and a carboxymethyl starch salt, and synthetic polymers such as a polyacrylate salt, a polyvinyl sulfate salt, a poly(4-vinylpyridine) salt, a polyamide, a polyarylamine salt, a naphthalene sulfonate condensate salt, a styrene-acrylate salt copolymer, a styrene-methacrylate salt copolymer, an acrylate ester-acrylate salt copolymer, an acrylate ester-methacrylate salt copolymer, a methacrylate ester-acrylate salt copolymer, a methacrylate ester-methacrylate salt copolymer, a styrene-itaconate salt copolymer, an itaconate ester-itaconate salt copolymer, a vinylnaphthalene-methacrylate salt copolymer, and a vinylnaphthalene-itaconate salt copolymer. Of these, ammonium salts of styrene-acrylate copolymers is suitable.

The water-soluble polymer preferably has a weight average molecular weight of from 2,000 to 1,000,000. If the weight average molecular weight is 2,000 or more, the scratch resistance of an image can be improved. If the weight average molecular weight is 1,000,000 or less, the ink viscosity can be readily set within the inkjet dischargeable range.

The proportion of the water-soluble polymer in the entire ink is preferably from 0.01 to 5 percent by mass. If the proportion is 0.01 percent by mass or more, the abrasion resistance of an image can be enhanced. If the proportion is 5 percent by mass or less, the concealing property can be enhanced.

The water-soluble polymer can be procured. Specific examples include, but are not limited to, JONCRYL® 61J (molecular weight, 10,000; acid value, 195), JONCRYL® 68 (molecular weight, 10,000; acid value, 195), JONCRYL® 450 (molecular weight, 10,000 to 20,000; acid value, 100), JONCRYL® 55 (molecular weight, 7,500; acid value, 200), JONCRYL® 555 (molecular weight, 5.000; acid value, 200), JONCRYL® 586 (molecular weight, 3,100: acid value, 105), JONCRYL® 680 (molecular weight, 3,900; acid value, 215), JONCRYL® 682 (molecular weight, 1,600, acid value 235) and JONCRYL® 683 (molecular weight, 7,300; acid value, 150), all manufactured by Johnson Polymer Corp.: B-36 (molecular weight, 6,800: acid value, 250); as well as TEGO Dispers 651, TEGO Dispers 656, TEGO Dispers 670, TEGO Dispers 685, TEGO Dispers 688, TEGO Dispers 750W, TEGO Dispers 755W, and TEGO Dispers 757W (manufactured by Evonik). In this context, the molecular weight refers to the weight average molecular weight.

It is desirable to contain a water-soluble resin and water-dispersible resin particles in ink at the same time to strike a balance between the fixability to an impermeable medium such as a transparent PET film and the dispersion stability of the glittery pigment.

Surfactant

The glittery ink of the present disclosure may contain a surfactant to secure the wettability of the ink to a recording medium.

The proportion of a surfactant added to ink is preferably from 0.1 to 5 percent by mass. When the proportion is 0.1 percent by mass or more, the image quality improves because the wettability of ink to a non-porous substrate is secured. When the proportion is 5 percent by mass or less, the ink is unlikely to foam so that excellent discharging stability is achieved.

An amphoteric surfactant, a nonionic surfactant, an anionic surfactant and a fluorochemical surfactant can be used in combination as the surfactant. Considering the relation between the dispersion stability of a coloring material and the image quality, nonionic surfactants are preferable and examples include, but are not limited to, polyoxyethylene alkyl phenyl ether, polyoxyethylene alkyl ester, polyoxyethylene alkyl amine, polyoxyethylene alkyl amide, polyoxyethylene propylene block polymer, sorbitan aliphatic esters, polyoxyethylene sorbitan aliphatic acid esters, and adducts of acetylene alcohol with ethylene oxides. Depending on the formulation, it is also possible to use a silicone-based surfactant alone.

The glittery ink of the present disclosure preferably contains a silicone-based surfactant. Since the pigment in glittery ink has a large specific gravity, the dispersion stability of the glittery ink is inferior to that of common color pigment for inkjet. The number of coarse particles is thus large. For this reason, the discharging stability is not slightly good, which tends to cause discharging bending and the variance in the discharging speed. In order to uniformly fill a solid image with such an ink, it is necessary to improve the discharging stability, increase the wettability of the ink, and increase the dot diameter. The ink containing a silicone-based surfactant, in particular, a polyether-based silicone surfactant, has excellent discharging stability and wettability.

Silicone-Based Surfactant

As the silicone-based surfactants, for example, the following is preferable: a compound (silicone-based compound) such as polydimethylsiloxane having a polysiloxane backbone including a hydrophilic group in the side chain or a hydrophilic polymer chain and a compound (silicone-based compound) such as polydimethylsiloxane having a polysiloxane backbone including a hydrophilic group at terminal or a hydrophilic polymer chain. The silicone-based surfactant means a compound having a polysiloxane backbone in its structure.

Specific examples of the hydrophilic group or the hydrophilic polymer chain include, but are not limited to, polyether group (polyethylene oxide, polypropylene oxide, and their copolymers, polyglycerin $(C_3H_6O(CH_2CH(OH)CH_2O)_n$—H), pyrrolidone, betain $(C_3H_6N+(C_2H_4)_2$—$CH_2COO^-)$, sulfonate $(C_3H_6O(C_2H_4O)_n$—$SO_3Na)$, phosphonate $(C_3H_6O(C_2H_4O)_n$—$P(=O)OHONa)$, and quaternary salts $(C_3H(N+(C_2H_4)_3Cl^-)$. In the Chemical Formulae above, n represents an integer of 1 and above. Of these, compounds having a polyether group are preferable.

In addition, a vinyl-based copolymer is also preferable which has a silicone-based compound chain such as polydimethylsiloxane in its side chain. This is obtained by copolymerization of a polydimethylsiloxane having a polymerizable vinyl group at a terminal with a copolymerizable monomer (it is preferable to at least partially use a hydrophilic monomer such as a (meth)acrylic acid or its salt in the monomer).

Of these, a compound having a polysiloxane backbone and a hydrophilic polymer chain is preferable. More preferred are compounds having a polyether group as the hydrophilic polymer chain. In addition, a non-ionic surfactant is particularly preferable in which a silicone-based surfactant has methyl polysiloxane as a hydrophobic group and a polyoxyethylene backbone as a hydrophilic group.

Examples of the silicone-based surfactant are polyether-modified silicone and silicone compounds having a polyoxyalkylene group.

The silicone-based surfactant is available on the market. Specific example include, but are not limited to, Silface SAG005 (HLB value: 7.0) and Silface SAG008 (HLB value: 7.0), both are manufactured by Nisshin Chemical Co., Ltd., FZ2110 (HLB value: 1.0, FZ2166 (HLB value: 5.8), SH-3772M (HLB value: 6.0), L7001 (HLB value: 7.4), SH-3773M (HLB value: 8.0), all of which are manufactured by Dow Corning Toray Co., Ltd.), KF-945 (HLB value: 4.0), and KF-6017 (HLB value: 4.5), both of which are manufactured by Shin-Etsu Chemical Co., Ltd., and FormBan MS-575 (HLB value: 5.0), manufactured by Ultra Additives Inc.).

The proportion of the surfactant to the entire ink is preferably from 0.1 to 4.0 percent by mass and more preferably from 0.2 to 2.0 percent by mass. When the proportion is from 0.1 to 4.0 percent by mass, fixability of ink onto various non-permeable recording media can be improved and image quality such as gloss can be improved.

The silicone surfactant is not particularly limited as long as it is used for ink and paint. It is preferable to use a surfactant represented by the following Chemical Formula 1 or 2 to obtain good discharging stability and print quality. In particular, the surfactant having the structure represented by the Chemical Formula 1 has high wettability, which makes it possible to print with larger dots. In addition, it is possible to obtain better discharging stability if a surfactant represented by the following Chemical Formula 3 is used in combination.

Hereinafter, the silicone surfactants represented by Chemical Formulae 1 to 3 will be described.

Chemical Formula 1

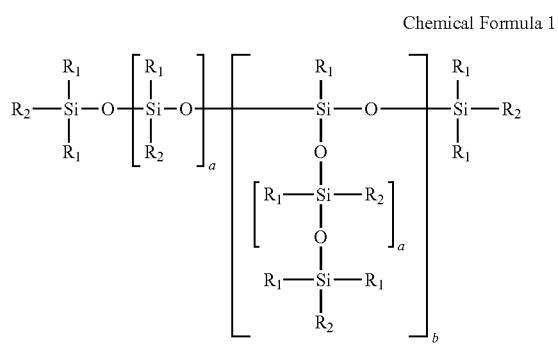

In Chemical Formula 1, a represents an integer of from 1 to 500 and b represents 0 or an integer of from 1 to 10. $R_1$ represents an alkyl group or an aryl group. $R_2$ represents any one of the following A, B, C, and D and at least one of $R_2$ includes A.

(A)

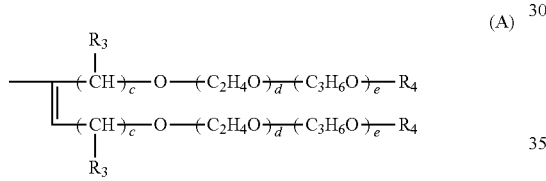

In (A), c represents an integer of from 1 to 20, d represents 0 or an integer of from 1 to 50, and e is 0 or an integer of from 1 to 50.

$R_3$ represents a hydrogen atom or an alkyl group and $R_4$ represents a hydrogen atom, an alkyl group, or an acrylic group.

(B)

In (B), a represents an integer of from 2 to 20. $R_5$ is a hydrogen atom, an alkyl group, an acyl group, and an ether group having a dimethylpropyl backbone.

(C)

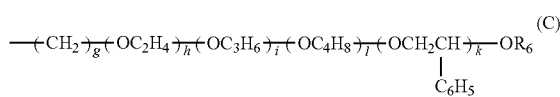

In (C), g represents an integer of from 2 to 6, h represents 0 or an integer of from 1 to 20, i represents an integer of from 1 to 50, j represents 0 or an integer of from 1 to 10, and k represents 0 or an integer of from 1 to 10. $R_6$ is a hydrogen atom, an alkyl group, or an acyl group.

(D): an alkyl group or an aryl group.

Specific examples of the procurable product of the compound represented by the Chemical Formula 1 include, but are not limited to, Tegotwin 4000 and Tegotwin 4100, manufactured by Evonik Industries AG.

Chemical Formula 2

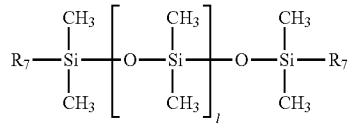

In the Chemical Formula 2, 1 represents an integer of from 10 to 80. $R_7$ represents the following substituent represented by (E).

(E)

In (E), m represents an integer of from 1 to 6, n represents 0 or an integer of from 1 to 50, o represents 0 or an integer of from 1 to 50, and n+o is an integer of 1 or greater. $R_8$ represents a hydrogen atom or an alkyl group having 1 to 6 carbon atoms, or a (meth)acrylic group.

Specific examples of the procurable products of the compound represented by Chemical Formula 2 include, but are not limited to, BY16-201 and SF8427 (manufactured by Dow Corning Toray Co., Ltd.), BYK-331, BYK-333, and BYK-UV3500 (manufactured by BYK-Chemie GmbH.), and Tegoglide 410, Tegoglide 432, Tegoglide 435, Tegoglide 440, and Tegoglide 450 (all manufactured by Evonik Industries AG).

Chemical Formula 3

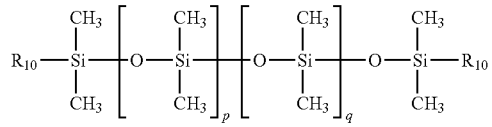

In the Chemical Formula 3, p and q each, independently represent integers of 1 or greater and p+q are an integer of from 3 to 50. $R_9$ represents a substitution group represented by the following (F) and $R_{10}$ represents an alkyl group having one to six carbon atoms.

(F)

In (F), r represents an integer of from 1 to 6, s represents 0 or an integer of from 1 to 50, t represents 0 or an integer of from 1 to 50, and s+t is an integer of 1 or greater. Ru represents a hydrogen atom or an alkyl group having 1 to 6 carbon atoms, or a (meth)acrylic group.

Specific examples of the procurable product of the compound represented by the Chemical Formula 3 include, but are not limited to, SF8428, FZ-2162, 8032 ADDITIVE. SH3749, FZ-77, L-7001, L-7002, FZ-2104, FZ-2110, FZ-2123, SH8400, and SH3773M (all manufactured by Dow Corning Toray Co., Ltd.), BYK-345, BYK-346, BYK-347, BYK-348, and BYK-349 (all manufactured by BYK-Chemie GmbH.), Tegowet 250, Tegowet 260, Tegowet 270, and Tegowet 280 (all manufactured by Evonik Industries AG), and KF-351A, KF-352A, KF-353, KF-354L, KF-355A, KF-615A, KF-640, KF-642, and KF-643 (all manufactured by Shin-Etsu Chemical Co., Ltd.).

Organic Solvent

The proportion of the organic solvent is preferably from 10 to 60 percent by mass and more preferably from 20 to 60 percent by mass to the entire glittery ink to enhance drying property and discharging reliability of the glittery ink.

The following organic solvents can be used in combination as the organic solvent for use in the present disclosure. It includes, but is not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of the water-soluble organic solvent include, but are not limited to, polyols such as ethylene glycol, diethylene glycol, 1,2-propanediol, 1,3-propanediol, 2-methyl-1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1, 2,4-butane triol, 1,2,3-butanetriol, 2,2,4-trimethyl-1,3-pentanediol, and petriol; polyol alkylethers such as ethylene glycol monoethylether, ethylene glycol monobutyl ether, diethylene glycol monomethylether, diethylene glycol monoethylether, diethylene glycol monobutyl ether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amines such as monoethanolamine, diethanolamine, and triethylamine; sulfur-containing compounds such as dimethyl sulfoxide, sulfolane, and thiodiethanol; propylene carbonate, and ethylene carbonate.

It is preferable to use an organic solvent having a boiling point of 250 or lower degrees C., which serves as a humectant and imparts a good drying property at the same time.

An organic solvent having a boiling point of 250 degrees C. or higher may be used for the glittery ink of the present disclosure. Such an organic solvent is used to ensure wettability while containing a highly concentrated solid content. This also impair the drying property, so that it is desirable to use the solvent as small as possible. Preferably, it is 0 to less than 1 percent. Specific examples include, but are not limited to, glycerin, diethylene glycol dibutyl ether, triethylene glycol dimethyl ether, tetraethylene glycol dimethyl ether, polyethylene glycol dimethyl ether, and polyethylene glycol monomethyl ether.

Other Components

Examples of the other components include, but are not limited to, defoaming agents, preservatives and fungicides, corrosion inhibitors, pH regulators, transparent anti-aging agents for rubber and plastic such as hindered phenol and hindered phenol amine, and an adjusting agent.

Defoaming Agent

The defoaming agent has no particular limit. Examples include, but are not limited to silicon-based defoaming agents, polyether-based defoaming agents, and aliphatic acid ester-based defoaming agents. These can be used alone or in combination. Of these, silicone-based defoaming agents are preferable to achieve the effect of foam breaking.

Preservatives and Fungicides

Preservatives and fungicides are not particularly limited. Specific examples include, but are not limited to, 1,2-benzisothiazoline-3-on, sodium benzoate, dehydrosodium acetate, sodium sorbate, pentachlorophenol sodium, and 2-pyridine thiol-1-oxide sodium.

Corrosion Inhibitor

The corrosion inhibitor has no particular limitation. Specific examples include, but are not limited to, acid sulfites and sodium thiosulfates.

pH Regulator

The pH regulator preferably controls the pH of ink to 7 or greater and more preferably 8.5<pH<9.8.

Specific examples include, but are not limited to, amines such as diethanol amine and triethanol amine.

Specific examples the pH regulators include, but are not limited to, hydroxides of alkali metal elements such as lithium hydroxide, sodium hydroxide, and potassium hydroxide: carbonates of alkali metals such as lithium carbonate, sodium carbonate, and potassium carbonate: hydroxides of quaternary ammonium, amines such as diethanol amine and triethanol amine; ammonium hydroxide, and hydroxides of quaternary phosphonium. The pH is controlled to secure corrosion prevention. Using a pH regulator such as an aminopropane diol derivative is extremely effective to prevent corrosion and elution.

Aminopropane diol derivatives are water-soluble organic basic compounds. Specific examples include, but are not limited to, 1-amino-2,3-propane diol, 1-methylamino-2,3-propane diol, 2-amino-2-methyl-1,3-propane diol, and 2-amino-2-ethyl-1,3-propane diol. Of these, 2-amino-2-ethyl-1,3-propane diol is particularly preferable. Inclusion of an aminopropane diol derivative and humectant in ink is preferable to enhance the corrosion durability. The proportion of aminopropane diol derivative as pH regulator is preferably from 0.1 to 5.0 percent by mass.

Water

Water is a major medium of an aqueous ink. As water, pure water and hyperpure water such as deionized water, ultrafiltered water, reverse osmosis water, and distilled water are preferable to remove ionic impurities as much as possible. In addition, it is preferable to use water sterilized through ultraviolet irradiation or addition of hydrogen peroxide to protect silver ink from incidence of mold or bacteria for an extended period of time of storage. The proportion of water in ink has no particular limit and can be suitably selected to suit to a particular application. To reduce burden on the environment and include other optional components, the proportion is preferably from 10 to 90 percent by mass and more preferably from 20 to 60 percent by mass.

Viscosity of Ink

The viscosity of ink to which the shear thinning agent is added is 40 mPa·s or less and preferably from 1 to 40 mPa s by an E-type viscometer at 20 degrees C. in order to obtain the discharging stability in inkjet printing methods.

It is desirable to appropriately balance the water, the organic solvent, the amount of the resin, and the surfactant contained in ink to achieve the viscosity in the above-specified range. As the amount of the solvent decreases, the hue tends to be closer to silver.

Inkjet Printing Method

The inkjet printing method preferably includes at least discharging glittery ink (hereinafter also referred to as ink) onto a recording medium (hereinafter also referred to as substrate).

The ink discharging is to apply a stimulus to an ink to discharge it for image printing. The device for discharging the ink is appropriately selected to particular applications without any limitation. A specific example thereof is a recording head (print head, ink discharging head). In particular, an ink discharging device is preferable which has ahead having multiple nozzle arrays and a sub-tank that accommodates an ink supplied from an ink cartridge and supplies the liquid to the head. It is preferable that the sub-tank mentioned above has a negative pressure producing device to produce a negative pressure in the sub-tank, an air releasing device to release air in the sub-tank, and a detector to detect whether there is ink therein by the difference of electric resistances.

The stimulus is generated by, for example, a stimulus generating device. There is no specific limit to the selection of the stimuli. Heat (temperature), pressure, vibration, and light can be suitably used. These may be used alone or in combination of two or more thereof. Of these, heat and pressure are preferable.

Examples of the stimulus generating device include, but are not limited to, a heater, a pressurizing device, a piezoelectric element, a vibrator, an ultrasonic oscillator, and light. Specific examples include, but are not limited to, a piezoelectric actuator such as the piezoelectric element, a thermal actuator that utilizes a phase change caused by film boiling of liquid using an electric heat conversion element such as a heat generating resistance, a shape-memory alloy actuator that uses the metal phase change due to temperature change, and an electrostatic actuator that utilizes an electrostatic force.

There is no specific limit to how the ink is discharged, which differs depending on the type of the stimulus. For example, in the case in which the stimulus is "heat", a method can be used in which thermal energy corresponding to recording signals is applied by, for example, a thermal head to generate foams in the ink and the ink is discharged and sprayed as droplets from the nozzles of the print head by the pressure of the foam. In addition, in a case in which the stimulus is "pressure", a method can be used in which ink is discharged and sprayed from the nozzles of a print head as droplets by applying a voltage to a piezoelectric element attached to the position of a pressure room located in the ink flow path in the print head, thereby bending the piezoelectric element, resulting in a decrease in the volume of the pressure room.

Of these, a method discharging an ink by applying a voltage to a piezoelectric element is preferable. No heat is generated in the piezoelectric system, which is advantageous to discharge an ink containing a resin. This is particularly suitable to minimize clogging in nozzles when an ink containing a small amount of humectant agent is used. In addition, to prevent non-discharging of ink attributable to clogging of nozzles, it is preferable to conduct false scanning by applying to a piezoelectric element a voltage above which ink is discharged. Furthermore, it is preferable to operate discharging of ink to an ink storing portion before false scanning reaching an amount corresponding to one page printing. In addition, it is preferable to include a scraper to scrape off the ink fixated on a receiver of false discharging. Using a wiper or a cutter is preferable as the scraper.

In the present disclosure, it is possible to dispose a heating device before or when the ink is discharged to widely cover a substrate with the ink discharged.

As the heating device, one or more common heating devices suitably selected can be used. For example, the heating device for forced-air heating, radiation heating, conductive heating, high frequency drying, or microwave drying can be used. Such a heating device can be mounted in a typical inkjet printer or externally attached thereto.

FIG. 1 is a schematic diagram illustrating an example of the inkjet printing device of the present disclosure. The following describes a serial or shuttle type of carriage scanning but includes a line-type inkjet printing device having a line head.

The inkjet printing device 101 illustrated in FIG. 1 has a sheet feeder tray 102 to accommodate a substrate placed in the inkjet printing device 101, an ejection tray 103 mounted on the inkjet printing device 101 to store the substrate on which images are printed (formed), and an ink container such as an ink cartridge installation unit 104. On the upper surface of the ink cartridge installation unit 104 is arranged an operation unit 105 including operation keys and a display. The ink cartridge installation unit 104 includes an ink cartridge front cover 115 that is openable and closable to detach and attach an ink cartridge 200. The reference numeral 111 represents an upper cover and, 112, the front surface of the front cover.

Figure 2:
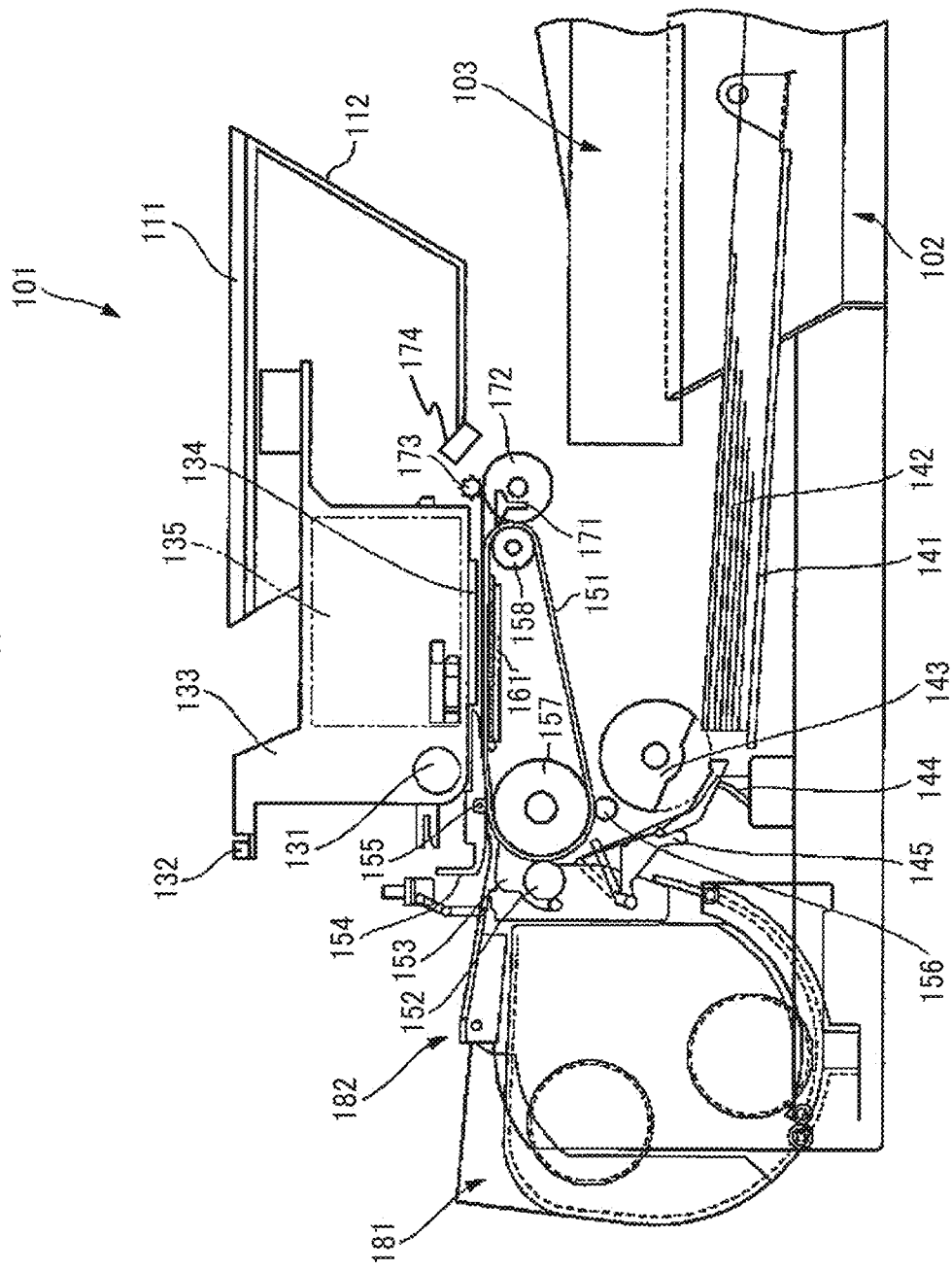
FIG. 2 is a diagram illustrating the configuration of the device illustrated in FIG. 1.

Inside the inkjet printing device 101, as illustrated in FIG. 2, a guide rod 131 and a stay 132 serving as guiding members laterally bridged from the right side plate to the left side plate hold a carriage 133 slidably movable in the main scanning direction. A main scanning motor moves the carriage 133 for scanning.

The carriage 133 has a print head 134 having five inkjet print heads that discharge ink droplets of each color of yellow (Y), cyan (C), magenta (M), black (Bk), and glittery ink while multiple nozzles are disposed in the direction crossing the main scanning direction with the ink droplet discharging direction downward.

As the heads for inkjet printing that form the print head 134, it is possible to use a device having an stimulus-generating device for discharging an ink such as a piezoelectric actuator such as a piezoelectric element, a thermal actuator that utilizes the phase change caused by film boiling of liquid by using an electric heat conversion element such as a heat element, a shape-memory alloy actuator that uses the metal phase change due to the temperature change, and an electrostatic actuator that uses an electrostatic force. In addition, it is also possible to have a heating mechanism to heat the ink in the print head 134.

The carriage 133 has sub tanks 135 for each color to supply each color ink to the print head 134. The ink is supplied and replenished to the sub-tank 135 from the ink cartridge 200 mounted onto the ink cartridge installation unit 104 via an ink supplying tube.

A sheet feeding unit to feed a substrate 142 loaded on a pressure plate as a substrate loader 141 of the sheet feeder tray 102 includes a half-moon shape roller (sheet feeding roller 143) to separate and feed the substrate 142 one piece by one piece from the substrate loader 141 and a separation pad 144. The separation pad 144 faces the sheet feeding roller 143 and is made of a material having a large friction index and biased towards the sheet feeding roller 143.

A conveyance unit to convey the substrate 142 fed from the sheet feeding unit below the print head 134 includes a conveyor belt 151 to electrostatically adsorb and convey the substrate 142, a counter roller 152 to convey the substrate 142 fed from the sheet feeding unit via a guide 145 while pinching the substrate 142 with the conveyor belt 151, a conveying guide 153 to make the substrate 142 track on the conveyor belt 151 by changing the conveying direction of the substrate 142 being sent substantially vertically upward by substantially 90 degrees, a front end pressure roller 155 biased towards the conveyor belt 151 by a pressure member 154, and a charging roller 156 to charge the surface of the conveyor belt 151.

The conveyor belt 151 is an endless form belt, suspended between a conveying roller 157 and a tension roller 158 and rotatable in the belt conveying direction. This conveyor belt 151 includes, for example, a top layer serving as a substrate adsorption surface made of a resin material such as a copolymer (ETFE) of tetrafluoroethylene and ethylene with no resistance control treatment having a thickness of about 40 μm, and a bottom layer (moderate resistance layer, earth layer) made of the same material as the top layer with resistance control treatment with carbon.

On the rear side of the conveyor belt 151, a guiding member 161 is disposed corresponding to the print region by the print head 134. For the present disclosure, the evaluation machine for the present disclosure is remodeled to have a guiding member with a film heater. The guiding member 161 is heated by the film heater to heat a recording medium.

An ejection unit for ejecting the substrate 142 on which images are printed by the print head 134 includes a separation claw 171 to separate the substrate 142 from the conveyor belt 151, a sheet ejection roller 172, and a sheet ejection roller 173. The substrate 142 is dried by heated wind by a fun heater 174 and thereafter output to a sheet ejection tray 103 located below the sheet ejection roller 172.

A duplex printing sheet feeding unit 181 is mounted in a detachable and attachable manner to the rear side of the inkjet printing device 101.

The duplex printing sheet feeding unit 181 takes in the substrate 142 returned by the reverse rotation of the conveyor belt 151, then reverses and feeds it back between the counter roller 152 and the conveyor belt 151. A bypass sheet feeding unit 182 is disposed on the upper surface of the duplex printing sheet feeding unit 181.

In this inkjet printing device, the substrate 142 is separated and fed from the sheet feeding unit one piece by one piece substantially vertically upward, guided by the guide 145, and conveyed while being pinched between the conveyor belt 151 and the counter roller 152. Furthermore, the front end of the substrate 142 is guided by the conveying guide 153 and pressed against the conveyor belt 151 by the front end pressure roller 155 to change the conveying direction substantially 90 degrees. Since the transfer roller 151 is charged by the charging roller 156 at this point in time, the substrate 142 is electrostatically adsorbed to the conveyor belt 151 and transferred. By driving the print head 134 in response to the image signal by moving the carriage 133, the ink droplet is discharged to the substrate 142 not in motion to record an image in an amount of one line and thereafter the substrate 142 is transferred in a predetermined amount to be ready for the recording for the next line. In response to a signal indicating that the printing has completed or the rear end of the substrate 142 has reached the image printing area, the printing operation stops and the substrate 142 is ejected to the sheet ejection tray 103.

The substrate for inkjet printing is mostly a non-porous substrate. This non-porous substrate is a resin film, laminated paper, coated paper, etc. having a surface formed of non-porous materials such as transparent or colored polyvinyl chloride film, polyethylene terephthalate (PET) film, acrylic film, polypropylene film, polyimide film, and polystyrene film. Also, it includes an article having a surface free of paper components such as wood pulp paper, Japanese paper, synthetic pulp paper, and synthetic fiber paper.

This inkjet printing can be applied to various printing devices employing inkjet printing such as printers, facsimile machines, photocopiers, and printers/photocopiers/multi-function peripherals for inkjet printing.

Terms such as image forming, recording, printing, and print used in the present disclosure represent the same meaning.

Also, recording media, media, and (print) substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but not limited thereto.

Preparation Example of Glittery Ink

Preparation of Silver Particle Liquid Dispersion 1

A total of 66.8 g of silver nitrate, 5.2 g of a polymer dispersant having a carboxyl group (Disperbyk 190 (BYK-190), solvent: water, nonvolatile component of 40 percent by mass, acid value of 10 mg KOH/g, amine value of 0 mg KOH/g, manufactured by BYK-Chemie GmbH.), and 1.8 g of cholic acid (manufactured by Wako Pure Chemical Industries, Ltd.) were added to 35 g of deionized water followed by vigorous stirring to obtain a suspension. A total of 9.1 g of an amine aqueous solution at 23.3 percent dimethyl aminoethanol in which 1.1 g of dimethyl aminoethanol (manufactured by Wako Pure Chemical Industries, Ltd.) was mixed with 7.0 g of water was gradually added to the suspension at a water temperature not surpassing 50 degrees C. followed by heating and stirring in a water bath at 60 degrees C. for 2.5 hours. The reaction liquid thus-obtained was filtered with a glass filter (GC-90, average pore diameter of 0.8 μm, manufactured by ADVANTEC CO., LTD.) to obtain a silver particle liquid dispersion 1 containing silver at 50 percent by mass, BYK-190 (nonvolatile component) at 3 percent by mass, and dimethyl aminoethanol at 1 percent by mass. The particle size distribution of the silver particle in the thus-obtained silver particle liquid dispersion 1 was measured by a particle size analyzer (Nanotrac Wave-EX150, manufactured by NIKKISO CO., LTD.). The number average particle diameter (D50) of primary particles was 20 nm.

Preparation of Ink

A total of 10.0 percent by mass of the silver particle liquid dispersion 1 (silver concentration of 50 percent by mass), 18.0 percent by mass of 1,2-propane diol (manufactured by Tokyo Chemical Industry Co. Ltd.), 8.0 percent by mass of 3-ethyl-3-hydroxyoxetane (manufactured by Ube Industries, Ltd.), 0.05 percent by mass of benzotriaxzole as antioxidant, 0.79 percent by mass of polycarbonate-based urethane resin liquid dispersion (SUPERFLEX® 460S, proportion of resin at 38 percent, manufactured by DKS Co., Ltd.), 0.5 percent by mass of BYK-345 (manufactured by BYK-Chemie GmbH) as surfactant, 0.2 percent by mass of 2,4,7,9-tetradecane-4,7 diol, 0.1 percent by mass of PROXEL LV as preservative and mildew-proofing agent, 0.2 or 0.3 percent by mass of the resin particles shown in Table 1 or Table 2, and the balance of deionized water to make the total 100 percent by mass followed by mixing and stirring. The mixture obtained was filtered with a polypropylene filter (Syringe filter, manufactured by Sartorius Stedim Biotech GmbH) having an average pore diameter of 0.5 μm to obtain silver ink 1.

Preparation of Silver Inks 2 to 14

Silver inks 2 to 14 were prepared in the same manner as in Silver ink 1 according to the formulations shown in the following Table 1.

The silver concentration of each ink was 5 percent by mass.

TABLE 1

| Substance and Product | | Proportion (percent by mass) | Comparative Example 1 Silver ink 1 | Example 1 Silver ink 2 | Example 2 Silver ink 3 |
|---|---|---|---|---|---|
| Pigment | Silver particle liquid dispersion 1 | 50 | 10.00 | 10.00 | 10.00 |
| Humectant | 1,2-propane diol | 100 | 18.00 | 18.00 | 18.00 |
| Permeating agent | 3-ethyl-3-hydroxy oxetane | 100 | 8.00 | 8.00 | 8.00 |
| Surfactant | BYK-345 | 100 | 0.50 | 0.50 | 0.50 |
| Defoaming agent | 2,4,7,9-tetradecane-4,7-diol | 100 | 0.20 | 0.20 | 0.20 |
| Preservative | PROXEL LV | 100 | 0.10 | 0.10 | 0.10 |
| Polycarbonate-based urethane resin emulsion | SUPERFLEX 420 NS | 32 | | 0.19 | 0.47 |
| Polycarbonate-based urethane resin emulsion | SUPERFLEX 460S | 38 | 0.79 | 0.63 | 0.39 |
| Polyester ether-based urethane resin emulsion | SUPERFLEX 170 | 33 | | | |
| Polyester ether-based urethane resin emulsion | SUPERFLEX 126 | 30 | | | |
| Polyester ether-based urethane resin emulsion | SUPERFLEX 150 | 30 | | | |
| Polyester resin emulsion | KA-3556S | 30.2 | | | |
| Polyester resin emulsion | KT-8803 | 29.7 | | | |
| Anti-oxidant | 1,2,3-benzotriazole | 100 | 0.05 | 0.05 | 0.05 |
| Water | | | 62.36 | 62.33 | 62.29 |
| Total | | | 100.00 | 100.00 | 100.00 |
| Substance and Product | | Proportion (percent by mass) | Example 3 Silver ink 4 | Comparative Example 2 Silver ink 5 | Example 4 Silver ink 6 |
| Pigment | Silver particle liquid dispersion 1 | 50 | 10.00 | 10.00 | 10.00 |
| Humectant | 1,2-propane diol | 100 | 18.00 | 18.00 | 18.00 |
| Permeating agent | 3-ethyl-3-hydroxy oxetane | 100 | 8.00 | 8.00 | 8.00 |
| Surfactant | BYK-345 | 100 | 0.50 | 0.50 | 0.50 |
| Defoaming agent | 2,4,7,9-tetradecane-4,7-diol | 100 | 0.20 | 0.20 | 0.20 |
| Preservative | PROXEL LV | 100 | 0.10 | 0.10 | 0.10 |
| Polycarbonate-based urethane resin emulsion | SUPERFLEX 420 NS | 32 | 0.75 | 0.30 | |
| Polycarbonate-based urethane resin emulsion | SUPERFLEX 460S | 38 | 0.16 | | 0.63 |
| Polyester ether-based urethane resin emulsion | SUPERFLEX 170 | 33 | | | 0.18 |
| Polyester ether-based urethane resin emulsion | SUPERFLEX 126 | 30 | | | |
| Polyester ether-based urethane resin emulsion | SUPERFLEX 150 | 30 | | | |
| Polyester resin emulsion | KA-3556S | 30.2 | | | |
| Polyester resin emulsion | KT-8803 | 29.7 | | | |
| Anti-oxidant | 1,2,3-benzotriazole | 100 | 0.05 | 0.05 | 0.05 |
| Water | | | 62.24 | 62.85 | 62.34 |
| Total | | | 100.00 | 100.00 | 100.00 |

TABLE 1-continued

| Substance and Product | | Proportion (percent by mass) | Example 5 Silver ink 7 | Example 6 Silver ink 8 | Example 7 Silver ink 9 |
|---|---|---|---|---|---|
| Pigment | Silver particle liquid dispersion 1 | 50 | 10.00 | 10.00 | 10.00 |
| Humectant | 1,2-propane diol | 100 | 18.00 | 18.00 | 18.00 |
| Permeating agent | 3-ethyl-3-hydroxy oxetane | 100 | 8.00 | 8.00 | 8.00 |
| Surfactant | BYK-345 | 100 | 0.50 | 0.50 | 0.50 |
| Defoaming agent | 2,4,7,9-tetradecane-4,7-diol | 100 | 0.20 | 0.20 | 0.20 |
| Preservative | PROXEL LV | 100 | 0.10 | 0.10 | 0.10 |
| Polycarbonate-based urethane resin emulsion | SUPERFLEX 420 NS | 32 | 0.19 | | |
| Polycarbonate-based urethane resin emulsion | SUPERFLEX 460S | 38 | | | |
| Polyester ether-based urethane resin emulsion | SUPERFLEX 170 | 33 | | 0.18 | |
| Polyester ether-based urethane resin emulsion | SUPERFLEX 126 | 30 | | | 0.20 |
| Polyester ether-based urethane resin emulsion | SUPERFLEX 150 | 30 | 0.80 | 0.80 | 0.80 |
| Polyester resin emulsion | KA-3556S | 30.2 | | | |
| Polyester resin emulsion | KT-8803 | 29.7 | | | |
| Anti-oxidant | 1,2,3-benzotriazole | 100 | 0.05 | 0.05 | 0.05 |
| Water | | | 62.16 | 62.17 | 62.15 |
| Total | | | 100.00 | 100.00 | 100.00 |

| Substance and Product | | Proportion (percent by mass) | Example 8 Silver ink 10 | Example 9 Silver ink 11 | Example 10 Silver ink 12 |
|---|---|---|---|---|---|
| Pigment | Silver particle liquid dispersion 1 | 50 | 10.00 | 10.00 | 10.00 |
| Humectant | 1,2-propane diol | 100 | 18.00 | 18.00 | 18.00 |
| Permeating agent | 3-ethyl-3-hydroxy oxetane | 100 | 8.00 | 8.00 | 8.00 |
| Surfactant | BYK-345 | 100 | 0.50 | 0.50 | 0.50 |
| Defoaming agent | 2,4,7,9-tetradecane-4,7-diol | 100 | 0.20 | 0.20 | 0.20 |
| Preservative | PROXEL LV | 100 | 0.10 | 0.10 | 0.10 |
| Polycarbonate-based urethane resin emulsion | SUPERFLEX 420 NS | 32 | | 0.19 | 0.19 |
| Polycarbonate-based urethane resin emulsion | SUPERFLEX 460S | 38 | | | |
| Polyester ether-based urethane resin emulsion | SUPERFLEX 170 | 33 | 0.18 | | |
| Polyester ether-based urethane resin emulsion | SUPERFLEX 126 | 30 | 0.80 | | |
| Polyester ether-based urethane resin emulsion | SUPERFLEX 150 | 30 | | | |
| Polyester resin emulsion | KA-3556S | 30.2 | | 0.79 | |
| Polyester resin emulsion | KT-8803 | 29.7 | | | 0.81 |
| Anti-oxidant | 1,2,3-benzotriazole | 100 | 0.05 | 0.05 | 0.05 |
| Water | | | 62.17 | 62.17 | 62.15 |
| Total | | | 100.00 | 100.00 | 100.00 |

TABLE 1-continued

| Substance and Product | | Proportion (percent by mass) | Example 11 Silver ink 13 | Example 12 Silver ink 14 |
|---|---|---|---|---|
| Pigment | Silver particle liquid dispersion 1 | 50 | 10.00 | 10.00 |
| Humectant | 1,2-propane diol | 100 | 18.00 | 18.00 |
| Permeating agent | 3-ethyl-3-hydroxy oxetane | 100 | 8.00 | 8.00 |
| Surfactant | BYK-345 | 100 | 0.50 | 0.50 |
| Defoaming agent | 2,4,7,9-tetradecane-4,7-diol | 100 | 0.20 | 0.20 |
| Preservative | PROXEL LV | 100 | 0.10 | 0.10 |
| Polycarbonate-based urethane resin emulsion | SUPERFLEX 420 NS | 32 | | |
| Polycarbonate-based urethane resin emulsion | SUPERFLEX 460S | 38 | | |
| Polyester ether-based urethane resin emulsion | SUPERFLEX 170 | 33 | 0.18 | 0.12 |
| Polyester ether-based urethane resin emulsion | SUPERFLEX 126 | 30 | | |
| Polyester ether-based urethane resin emulsion | SUPERFLEX 150 | 30 | 0.70 | 0.47 |
| Polyester resin emulsion | KA-3556S | 30.2 | | |
| Polyester resin emulsion | KT-8803 | 29.7 | 0.10 | 0.07 |
| Anti-oxidant | 1,2,3-benzotriazole | 100 | 0.05 | 0.05 |
| Water | | | 62.17 | 62.49 |
| Total | | | 100.00 | 100.00 |

TABLE 2

| Substance and Product | | Tg (degrees C.) | Thermosoftening temperature (degrees C.) | Young's modulus (MPa) | Number average particle diameter D50 (nm) | Concentration (percent by mass) |
|---|---|---|---|---|---|---|
| Polycarbonate-based urethane resin emulsion | SUPERFLEX 420 NX | −10 | 198 | 565 | 10 | 32 |
| Polycarbonate-based urethane resin emulsion | SUPERFLEX 460S | −28 | 99 | 10.8 | 30 | 38 |
| Polyester ether-based urethane resin emulsion | SUPERFLEX 170 | 75 | 188 | 884 | 10 | 33 |
| Polyester ether-based urethane resin emulsion | SUPERFLEX 126 | 72 | 166 | 1328 | 20 | 30 |
| Polyester ether-based urethane resin emulsion | SUPERFLEX 150 | 40 | 195 | 807 | 30 | 30 |
| Polyester resin emulsion | ELITEL® KA-3556S | 80 | | | 30 | 30.2 |
| Polyester resin emulsion | ELITEL® KT-8803 | 65 | | | 100 | 29.7 |

In Table 2, SUPERFLEX is a product name of DKS Co., Ltd. and ELITEL is a product name of UNITIKA LTD. The thermosoftening temperature means the elution starting temperature of resin particles.

Printing Device and Printing Method

First, a solid image (100 percent duty) of metallic ink liquid was output on gloss paper (photo paper silk grain type, MPGSA420 gloss paper for inkjet, manufactured by Mitsubishi Chemical Corporation) using an inkjet printer (remodeled based on IPSiO GXe5500, manufactured by Ricoh Co., Ltd.) in a gloss paper mode of 1200 dpi×1200 dpi at a platen temperature of 40 degrees C. and a fan heater temperature of 50 degrees C. Immediately after the output, the printed matter obtained was put into an oven heated to 85 degrees C. for two minutes, dried and taken out. Ra of the gloss paper is 11 nm.

Evaluation Sample

Printed matter was obtained by printing with the silver inks 1 to 14 according to the printing method specified above. The printed matter was evaluated regarding the following items.

Evaluation Item

Evaluation of Degree of Gloss

The 20° glossiness of dried printed matter was measured by a gloss meter (Micro-TRI-gloss, manufactured by BYK Gardner Corp.).

The value of 20° glossiness is preferably 350 or more. More preferably, it is 600 or greater. At 350 or greater, mirror image clarity appears. If it is 600 or greater, the gloss is nearly on a par with silver foil. The tolerable range of the present disclosure is 350 or greater.

S: 20° glossiness of 850 or greater
A: 20° glossiness of from 700 to less than 850
B: 20° glossiness of from 650 to less than 700
C: 20° glossiness of from 600 to less than 650
D: 20° glossiness of less than 600

Evaluation on Abrasion Resistance

The dried printed matter was placed on a color fastness rubbing tester AB-301 (manufactured by TESTER SANGYO CO. LTD.) and rubbed 10 times with a friction element (load 300 g) on which white cotton (according to IS L 0803 format) was attached to the contact portion. The degree of deterioration was visually checked and the abrasion resistance was evaluated according to the following criteria. The grades S, A, and B are allowable.

S: Number of visible scratches was zero
A: Number of visible scratches was less than 5, no foundation visible
B: Number of visible scratches was from 5 to less than 10, no foundation visible
C: Number of visible scratches was 10 or more, foundation (substrate) partially exposed
D: Number of visible scratches was 10 or more, most of foundation (substrate) exposed The evaluation results of the printed matter of each Example and Comparative Example are shown in Table 3.

TABLE 3

|  | Comparative Example 1 Silver ink 1 | Example 1 Silver ink 2 | Example 2 Silver ink 3 | Example 3 Silver ink 4 | Comparative Example 2 Silver ink 5 |
|---|---|---|---|---|---|
| Diameter c (nm) of silver particle | 20 | 20 | 20 | 20 | 20 |
| Diameter a (nm) of resin particle | 10 | 10 | 10 | 10 | 10 |
| Diameter b (nm) of resin particle | 30 | 30 | 30 | 30 | 30 |
| Mass ratio of resin particle (glittery pigment to resin particle) | 5 to 0.3 | 5 to 0.3 | 5 to 0.3 | 5 to 0.3 | 5 to 0.3 |
| Mixing proportion (percent by mass) of resin particle of particle diameter a | 0 percent | 20.00 percent | 50.00 percent | 80.00 percent | 100 percent |
| 20° glossiness | 840 B | 880 S | 800 A | 700 A | 650 B |
| Abrasion resistance | A | B | B | B | C |

|  | Example 4 Silver ink 6 | Example 5 Silver ink 7 | Example 6 Silver ink 8 | Example 7 Silver ink 9 | Example 8 Silver ink 10 |
|---|---|---|---|---|---|
| Diameter c (nm) of silver particle | 20 | 20 | 20 | 20 | 20 |
| Diameter a (nm) of resin particle | 10 | 10 | 10 | 20 | 10 |
| Diameter b (nm) of resin particle | 30 | 30 | 30 | 30 | 20 |
| Mass ratio of resin particle (glittery pigment to resin particle) | 5 to 0.3 | 5 to 0.3 | 5 to 0.3 | 5 to 0.3 | 5 to 0.3 |
| Mixing proportion (percent by mass) of resin particle of particle diameter a | 20.00 percent | 20.00 percent | 20.00 percent | 20.00 percent | 20.00 percent |
| 20° glossiness | 880 S | 890 S | 920 S | 800 A | 860 S |
| Abrasion resistance | A | A | A | S | S |

|  | Example 9 Silver ink 11 | Example 10 Silver ink 12 | Example 11 Silver ink 13 | Example 12 Silver ink 14 |
|---|---|---|---|---|
| Diameter c (nm) of silver particle | 20 | 20 | 20 | 20 |
| Diameter a (nm) of resin particle | 10 | 10 | 10 | 10 |
| Diameter b (nm) of resin particle | 30 | 30 | 30 | 30 |

TABLE 3-continued

|  | | | | |
|---|---|---|---|---|
| Mass ratio of resin particle (glittery pigment to resin particle) | 5 to 0.3 | 5 to 0.3 | 5 to 0.3 | 5 to 0.2 |
| Mixing proportion (percent by mass) of resin particle of particle diameter a | 20.00 percent | 20.00 percent | 20.00 percent | 20.00 percent |
| 20° glossiness | 680 | 720 | 900 | 940 |
|  | B | A | S | S |
| Abrasion resistance | S | S | S | S |

The particle diameter c of silver particles in Table 3 means the particle diameter corresponding to the peak of the maximum number of particles in the particle diameter distribution of the silver particles as measured by the dynamic light scattering particle size distribution measuring device and under the condition mentioned above.

The particle diameter a of the resin particles means the minimum particle diameter among the particle diameters corresponding to the peaks in the particle diameter distribution of the resin particles as measured by the dynamic light scattering particle size distribution measuring device and under the condition mentioned above.

The particle diameter b of the resin particles means the maximum particle diameter among the particle diameters corresponding to the peaks in the particle diameter distribution of the resin particles as measured by the dynamic light scattering particle size distribution measuring device and under the condition mentioned above.

FIG. 4 is a graph illustrating the relationship between the proportion of the resin particle or the resin particle proportion (percent by mass) of the particle diameter a and 20° glossiness in Examples 1 to 3 and Comparative Examples 1 and 2. When Comparative Examples 1 and 2 are compared with Example 1, the result of Example 1 had a higher 20° glossiness (880 in Example 1). Comparative Example 1 in which the resin particle proportion of the particle diameter a is zero percent and Comparative Example 2 in which the resin particle proportion of the particle diameter a is a hundred percent had lower 200 glossiness than that of Example 1. The resin particle proportion in FIG. 4 means the proportion of the resin particle having a particle diameter a or the proportion of the resin particle having a particle diameter b based on mass to the entire mixed rein particles.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A glittery ink comprising:
   glittery pigment particles;
   resin particles; and
   an organic solvent,
   wherein the following relationships are satisfied: a≤c≤b and a<b, where a represents a particle diameter of the resin particles corresponding to the minimum of two or more peaks in a particle size distribution as measured by a dynamic light scattering particle size distribution measuring device, b represents a particle diameter of the resin particles corresponding to the maximum of the two or more peaks in the particle size distribution, and c represents a particle diameter of the glittery pigment particles corresponding to a maximum number of particles in a particle size distribution as measured by the dynamic light scattering particle size distribution measuring device.

2. The glittery ink according to claim 1,
   wherein the resin particles are a mixture of two or more types of resin particles having different number average particle diameters,
   wherein the two or more types of resin particles comprise one or more types of resin particles 1 having a number average particle diameter smaller than a number average particle diameter of the glittery pigment particles and one or more types of resin particles 2 having a number average particle diameter greater than the number average particle diameter of the glittery pigment particles.

3. The glittery ink according to claim 2,
   wherein the number average particle diameter of the resin particles 1 is by 10 nm or more smaller than the number average particle diameter of the glittery pigment particles,
   wherein the number average particle diameter of the resin particles 2 is by 10 nm or more greater than the number average particle diameter of the glittery pigment particles.

4. The glittery ink according to claim 2,
   wherein the resin particles 1 have a thermosoftening temperature lower than a thermosoftening temperature of the resin particles 2.

5. The glittery ink according to claim 1,
   wherein the resin particles have polyurethane resin chains.

6. The glittery ink according to claim 1,
   wherein the resin particles have polyester resin chains.

7. The glittery ink according to claim 1,
   wherein the glittery pigment particles have a volume average particle diameter (D50) of from 20 to 100 nm.

8. An image forming device comprising:
   a print head; and
   the glittery ink of claim 1 in the print head.

* * * * *